United States Patent
Ordentlich et al.

(10) Patent No.: US 8,300,979 B2
(45) Date of Patent: Oct. 30, 2012

(54) METHOD AND SYSTEM FOR ROBUST UNIVERSAL DENOISING OF NOISY DATA SETS

(75) Inventors: Erik Ordentlich, San Jose, CA (US); Marcelo Weinberger, San Jose, CA (US); Gadiel Seroussi, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 762 days.

(21) Appl. No.: 12/511,776

(22) Filed: Jul. 29, 2009

(65) Prior Publication Data
US 2011/0026848 A1 Feb. 3, 2011

(51) Int. Cl.
*G06K 9/40* (2006.01)
(52) U.S. Cl. ......... 382/275; 382/254; 382/260; 382/274
(58) Field of Classification Search .................. 382/254, 382/260–266, 274–275
See application file for complete search history.

(56) References Cited

U.S. PATENT DOCUMENTS

| | | | |
|---|---|---|---|
| 7,271,749 B2* | 9/2007 | Weissman et al. | 341/107 |
| 7,656,942 B2* | 2/2010 | Ramirez et al. | 375/232 |
| 7,925,099 B2* | 4/2011 | Ramirez et al. | 382/232 |
| 2002/0124652 A1* | 9/2002 | Schultz et al. | 73/587 |
| 2005/0289433 A1* | 12/2005 | Weissman et al. | 714/755 |
| 2006/0070256 A1* | 4/2006 | Weissman et al. | 34/225 |
| 2010/0278447 A1* | 11/2010 | Seroussi et al. | 382/260 |

* cited by examiner

*Primary Examiner* — Wesley Tucker

(57) ABSTRACT

Embodiments of the present invention provide context-class-based universal denoising of noisy images and other noise-corrupted data sets. Prediction-error statistics for each prediction class, relative to a prefiltered image, are collected to estimate a bias for each prediction class, and prediction-error statistics for each conditioning class, relative to a prefiltered image, are accumulated based on the difference between predicted values and corresponding prefiltered-image symbols. The prediction-error statistics are accumulated using computed prediction-error-statistics vectors, with inversion of a prediction-error vector generated from each prediction prior to accumulation in a prediction-error-statistics vector. Conditional probability distributions are computed for individual contexts, which allow for computing a clean-image-estimated, value for each noisy-image value by minimizing a computed distortion over a range of possible estimated-clean-image symbols.

10 Claims, 35 Drawing Sheets

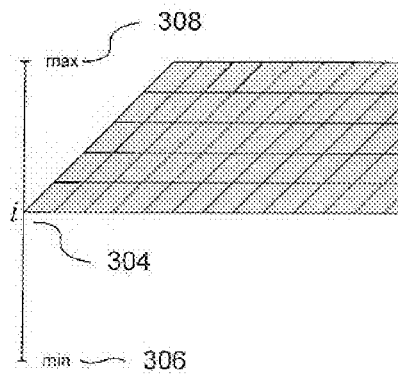 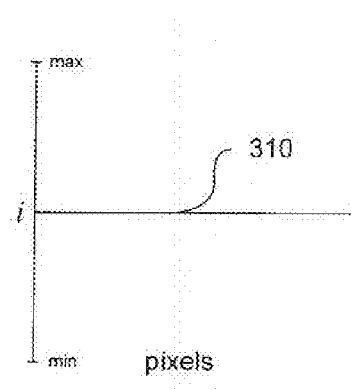
Figure 3A
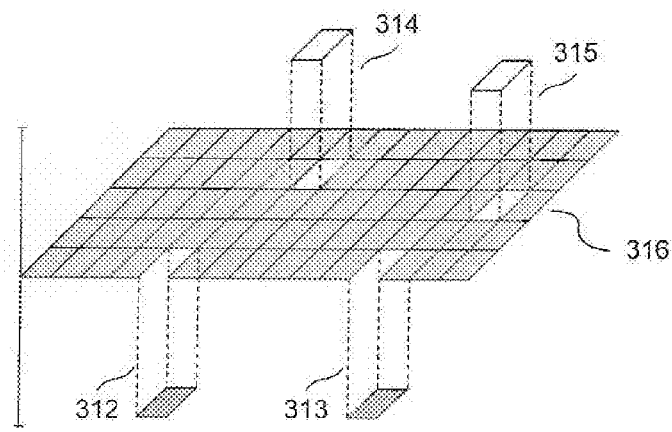 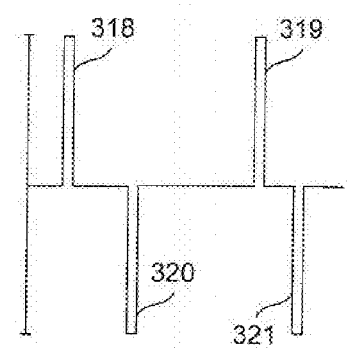
Figure 3B
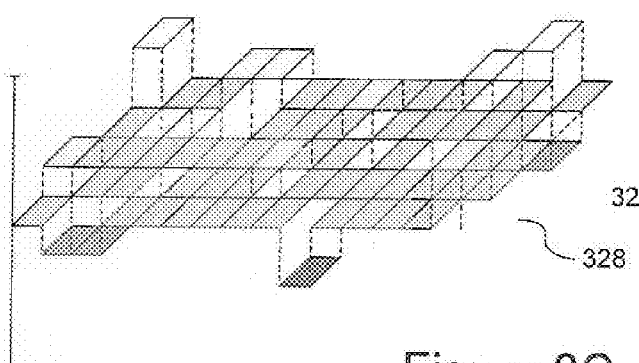 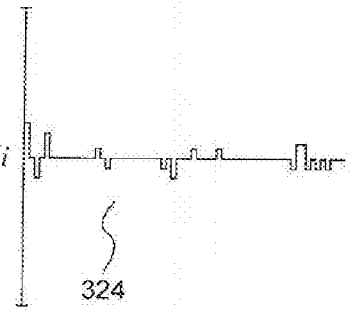
Figure 3C

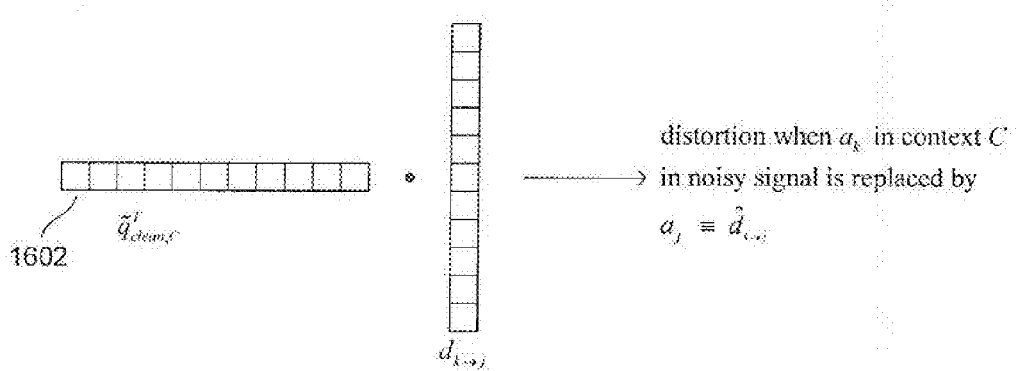
Figure 16
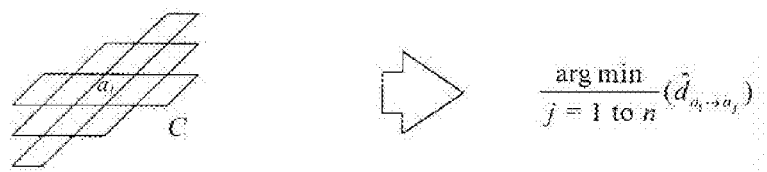
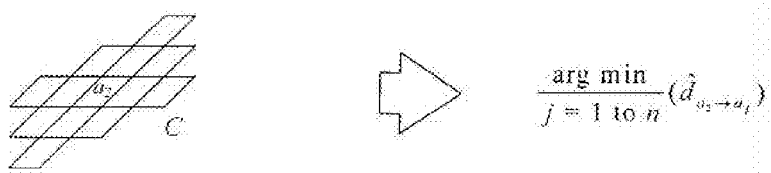
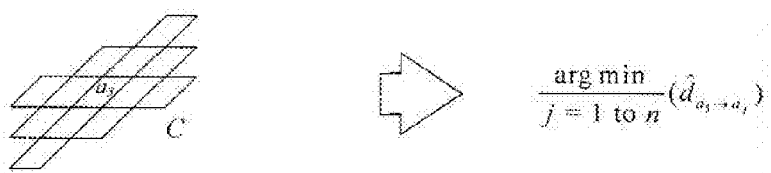
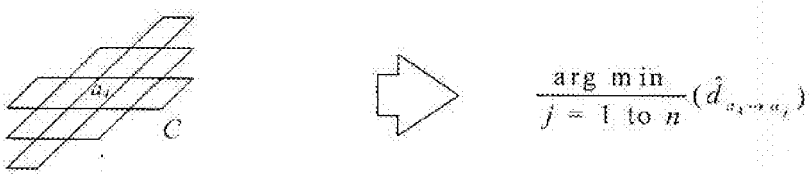
Figure 17

$$M'_{(\bar{x}_i)} = S^Y_{\bar{x}_i}\left(\Pi^T\right)^{-1}$$

where $$S^Y_{\bar{x}_i} \equiv \left[\mathbf{0}_{M,(M-1-\bar{x}_i)_l} \mid \mathbf{I}_M \mid \mathbf{0}_{M,\bar{x}_i}\right]^T$$

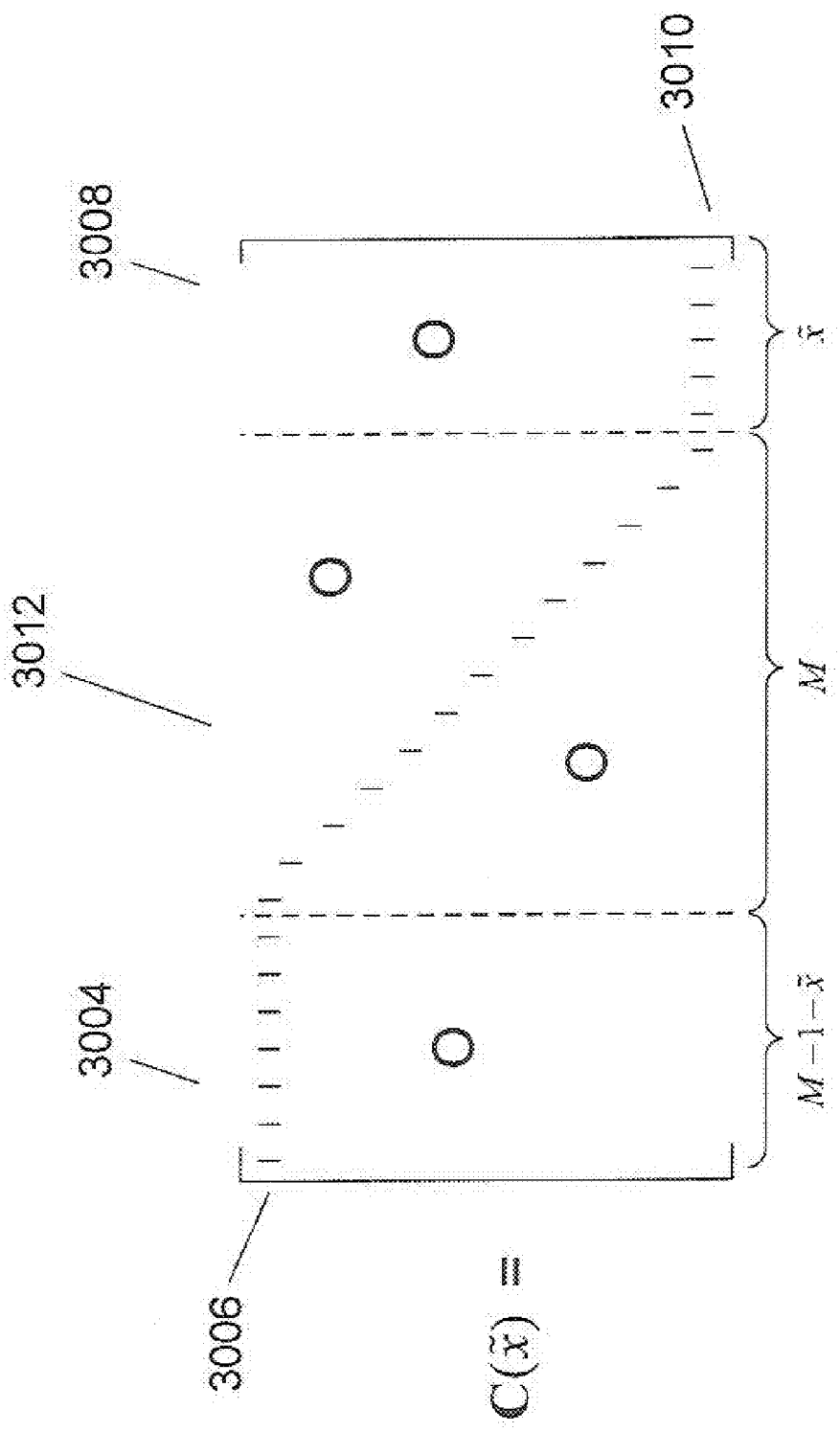

METHOD AND SYSTEM FOR ROBUST UNIVERSAL DENOISING OF NOISY DATA SETS

TECHNICAL FIELD

The present invention is related to the detection and amelioration of noise in data and, in particular, to a method and system for discrete universal-denoising that uses statistics accumulated for conditioning classes, with minimal non-additive noise-related distortion, to infer clean data values from noisy data values of a noisy data set.

BACKGROUND OF THE INVENTION

Whenever information is electronically encoded as original, or clean, data, and then transferred from the data source to a data destination, noise may be introduced by the transfer process, resulting in alteration of the original, clean data and reception of the data by the data destination as noisy data. For example, when information is electronically encoded as a sequence of binary bits and sent through a communications network, such as a local Ethernet, to a destination node, there is a small probability that any given bit within the original, or clean, sequence of binary bits ends up being corrupted during transfer through the Ethernet, resulting in a "0" bit in the clean data being altered to a "1" bit in the noisy data received at the destination node, or a "1" bit in the clean data altered to a "0" bit in the noisy data received at the destination node. Although electronic communications media are classic examples of noisy channels, almost any type of data transfer or storage may result in data corruption, and therefore may be modeled as a noisy channel. For example, there is a small probability, associated with each bit of a block of binary data, that the bit will be altered when the block of data is stored and then retrieved from a hard disk, or even when the block of data is transferred from local cache memory to global random-access memory within a computer system. In general, redundant data, including check sums and cyclical redundancy codes, are embedded into data encodings to allow corrupted data to be detected and repaired. However, the amount of redundant data needed, and the accompanying costs and inefficiencies associated with redundant data, grows as the acceptable level of undetectable and/or unrepairable data corruption decreases.

In many cases, data corruption may occur prior to a point in a process at which redundant information can be embedded into a data signal to facilitate error detection and correction. As one example, a scanner that optically scans a printed document to produce a digital, electronic encoding of an image of the document can be viewed as a noisy channel in which discrepancies between the digitally encoded image of the document and the original document may arise. Such discrepancies may be introduced by a variety of optical and electronic components within the scanner that focus an optical image of the document onto a light-detecting component that transforms the detected optical image into an electronically encoded image of the document. When the digitally encoded image of the document is displayed or printed, different types of noise may be perceived as graininess, irregularities along the edges of text characters or objects within graphical images, uneven shading or coloration, random speckling, or other such visually distinguishable differences between the printed or displayed version of the digitally encoded data and the original document.

Denoising techniques can be applied to a noisy, digitally encoded image in order to produce a denoised, digitally encoded image that more accurately represents the original document that was scanned to produce the noisy, digitally encoded image. Denoising techniques may also be applied to data received over channels that are too noisy for recovery of the original data using the redundant data incorporated within the data to facilitate error correction. A wide variety of additional applications of denoising techniques have been identified and are well known. A discrete universal denoiser method ("DUDE") has been developed for denoising the noisy output signal of a discrete, memoryless data-transmission channel without relying on knowledge of, or assumptions concerning, the statistical properties of the original, or clean, signal input to the discrete, memory-less channel. Even more recently, the DUDE method has been extended for denoising continuous tone images, such as scanned documents or images. The extended DUDE method is referred to as the "DUDE-CTI method," or simply as the "DUDE-CTI." The DUDE-CTI method is intended for use in a variety of image and data scanning, processing, and transfer applications. The DUDE-CTI method has shown promising results for certain types of noisy channels. An efficient DUDE-CTI depends on collections of symbol-occurrence statistics for each of a large number of different pixel contexts observed within an image. Because of the large number of possible contexts, an expedient approach is to coalesce individual contexts into groups, or classes, of contexts, and to then collect statistics on a context-class basis, rather than for individual contexts. However, such methods may suffer from the accumulation of distortions in the statistics accumulated for context classes due to the occurrence of non-additive noise, such as salt-and-pepper noise and M-ary symmetric noise, in the noisy image. Information-theory researchers, denoising-method developers, and manufactures and users of a variety of data-acquisition, data-storage, data-processing, and data-transfer devices that employ denoisers, continue to seek efficient and effective denoising systems and methods that can effectively denoise data corrupted by non-additive noise, such as salt-and-pepper noise, in the noisy image.

BRIEF DESCRIPTION OF THE DRAWINGS

FIGS. 3A-C illustrate salt-and-pepper noise and Gaussian noise.

FIG. 16 illustrates the computation of an estimate of the distortion produced by replacing symbol $a_k$ within context C in a noisy signal by the replacement symbol $a_j$.

FIG. 17 illustrates a symbol-replacement function $g(C,z)$.

FIGS. 26 and 27 illustrate construction of the prediction-error vector for a particular context used in an update step in prediction-error accumulation during a statistics-collection phase of embodiments of the present invention.

FIG. 30 illustrates a matrix $C(\tilde{x})$ that is used during normalization of prediction-error-statistics vectors according to embodiments of the present invention.

DETAILED DESCRIPTION OF THE INVENTION

Embodiments of the present invention provide context-class-based universal denoising of noisy images and other noise-corrupted data sets. Prediction-error statistics for each prediction class, relative to a prefiltered image, are collected to estimate a bias for each prediction class, and prediction-error statistics for each conditioning class, relative to the noisy image, are accumulated based on the difference between predicted values and corresponding noisy-image symbols. The prediction-error statistics are accumulated using computed prediction-error-statistics vectors, with transformation of a prediction-error vector generated from each prediction prior to accumulation in a prediction-error-statistics vector. Conditional probability distributions are computed for individual contexts, which allow for computing a clean-image-estimated value for each noisy-image value by minimizing a computed distortion over a range of possible estimated-clean-image symbols.

In a first subsection, below, denoising, the DUDE, and DUDE-CTI approaches to denoising are discussed, to facilitate subsequent detailed discussion, in the following subsection, of embodiments of the present invention.

Denoising, DUDE, and DUDE-CTI

In various embodiments of the present invention, each symbol of a noisy signal, received through a noisy channel, is considered within a well-defined context of neighboring symbols. A noisy signal can be analyzed in a first pass to assign each symbol to a context class and to collect prediction-error statistics for context classes that allow, in a subsequent pass, likely clean-signal symbols corresponding to each noisy-signal symbol to be predicted.

Figure 1:
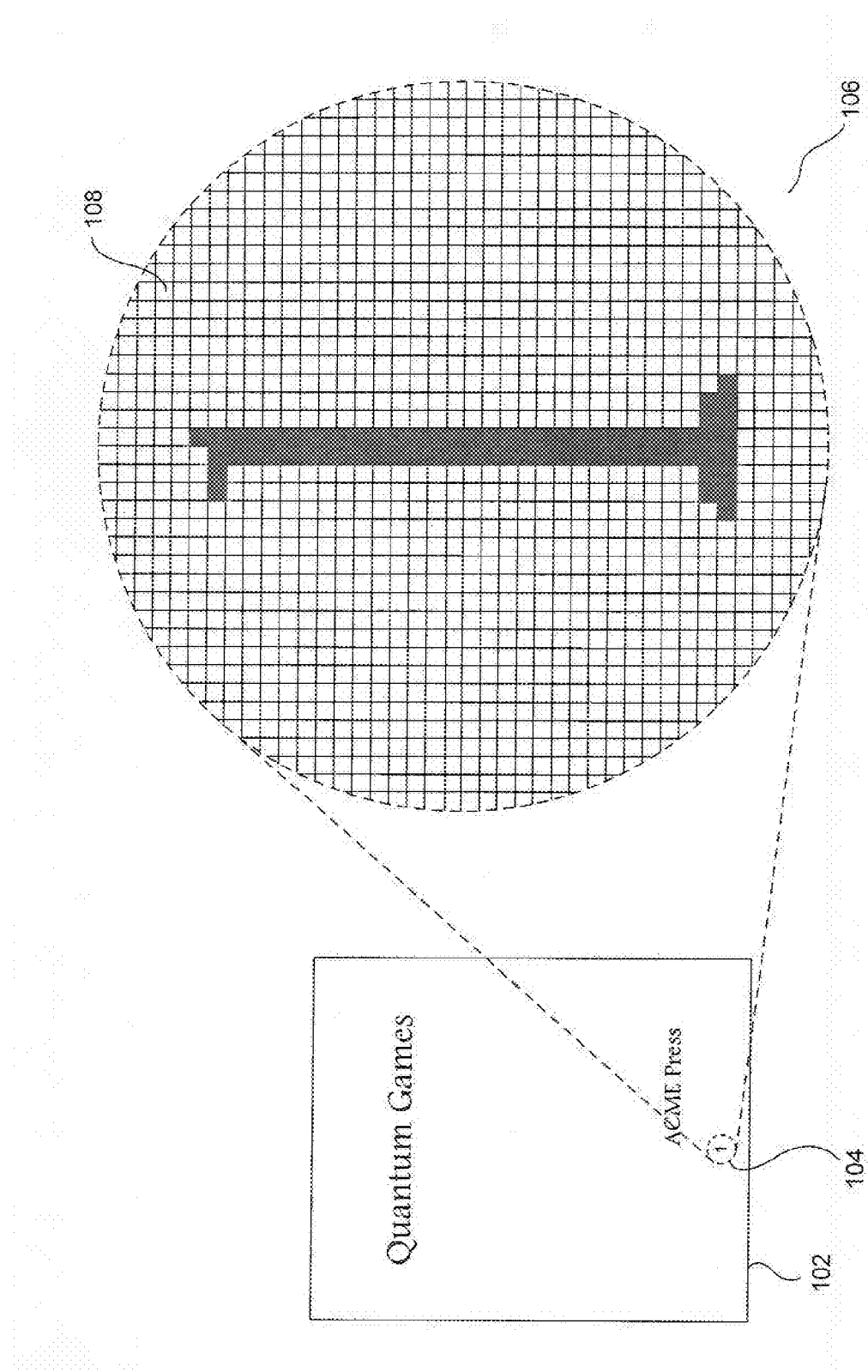
FIG. 1 illustrates digital encoding of a printed document to produce a clean image signal.

FIG. 1 illustrates digital encoding of a printed document to produce a clean image signal. In FIG. 1, a displayed image 102 of a digitally encoded title page is shown, with a small disk-like region 104 of the displayed document shown at a higher magnification 106. The document is displayed as an array of square pixels, such as pixel 108, and the digital encoding of the document comprises a sequence of integers, each integer representing an intensity value of a corresponding pixel. Commonly, for multi-level document images, pixel values range over a grayscale range from 0, indicating black, to 255, indicating white, with a continuous range of intermediate gray tones encoded by the integers 1-254. The integers 0-255 can therefore be considered to be symbols of a 256-symbol alphabet. Different techniques may be used to encode colored images. In one technique, three different grayscale-like encodings are used to encode intensity values of three primary colors, and the three different encodings are simultaneously displayed or rendered by a three-primary-color display or rendering device. Alternatively, a larger range of integer values may be used to encode a full range of color and intensity values in a single integer field. Thus, a pixel corresponds to a small region of a displayed or printed image, and the integer value associated with a pixel in a digitally encoded image represents the intensity, or both the color and intensity, for display or rendering of the pixel on a display or rendering device.

Figure 2:
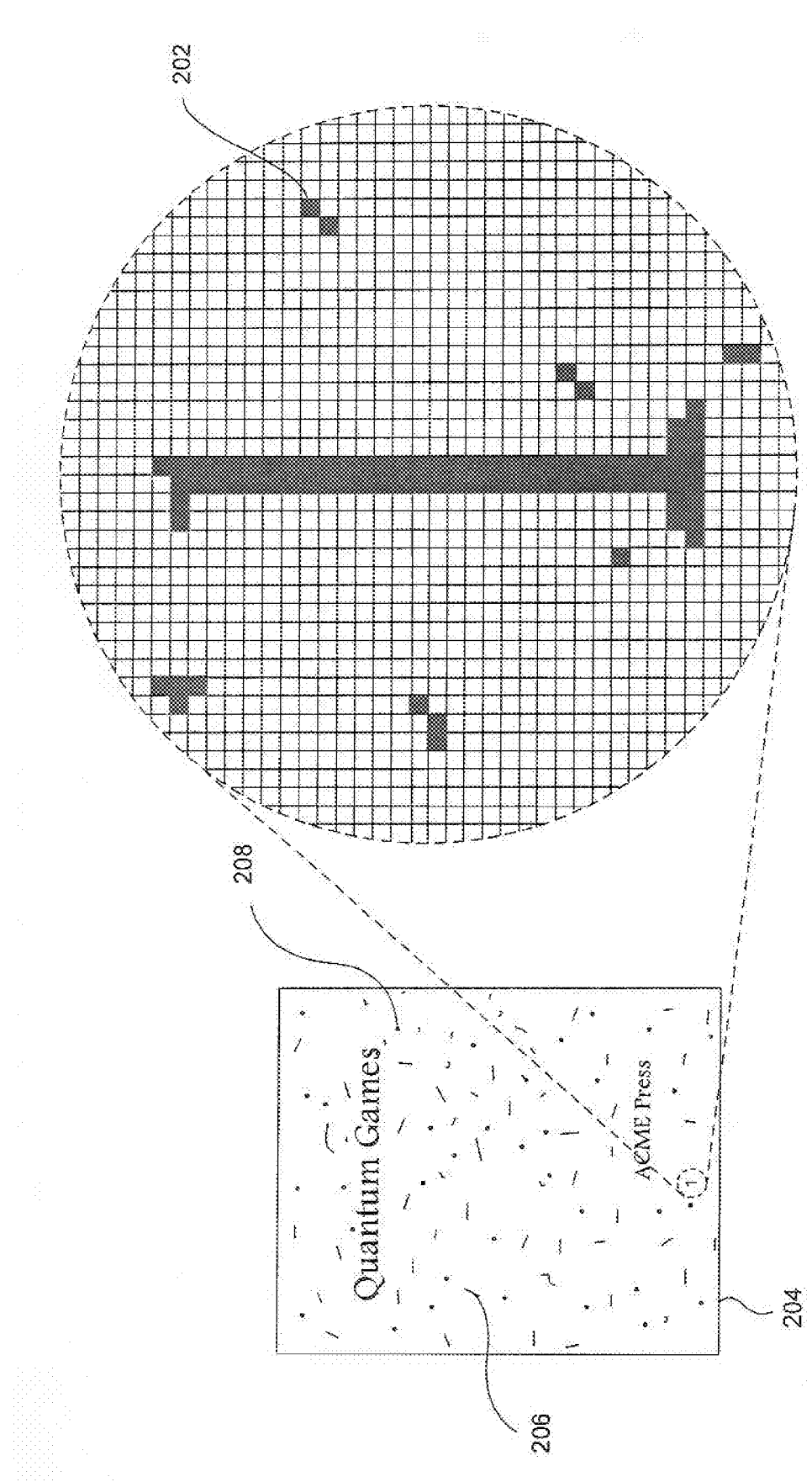
FIG. 2 illustrates a noisy signal corresponding to the clean image signal discussed with reference to in FIG. 1.

A printed document that is to be scanned by a scanning device can be considered as a clean signal. In other words, the printed document can be viewed as a large set of pixel-intensity values that, when displayed or printed, would appear visually indistinguishable from the original, printed document. The pixel data actually obtained as a result of scanning may be considered to be a noisy signal. FIG. 2 illustrates a noisy signal corresponding to the clean image signal discussed with reference to in FIG. 1. In comparing FIG. 2 to FIG. 1, it is easily observed that a number of pixels, such as pixel 202, have intensity values different from the values that the pixels would be expected to have based on the original, clean image shown in FIG. 1. The corresponding noisy image 204 is seen to have a number of visually discernable distortions, such as streaks 206 and speckles 208. In a scanning application, the original document represents the clean image signal, and the digitally encoded document produced by scanning the original document represents the noisy image signal. In various other applications, the clean signal may be an initial, digitally encoded document or other information source, and the noisy signal may be the corresponding digitally encoded document or other information source received following transmission of the clean signal through a communications medium or retrieved following storage of the clean signal in a volatile or non-volatile electronic data-storage device.

FIGS. 3A-C illustrate salt-and-pepper noise and Gaussian noise. FIG. 3A shows a small portion of a digitally encoded image 302, all pixels of which have a uniform intensity value i 304 with respect to a range of pixel-intensity values from a minimum value (306 in FIG. 3) to a maximum value (308 in FIG. 3). A two-dimensional graph of the intensity values of individual pixels from the region, in which pixels are taken in some particular order from the two-dimensional image, produces a straight, horizontal line 310. FIG. 3B illustrates salt-and-pepper noise added to the small region of uniform pixel intensity shown in FIG. 3A. Salt-and-pepper noise can be modeled as independent probabilities, associated with each pixel, that the intensity value associated with the pixel is altered, or corrupted, by a noisy channel to have either a minimum intensity value or a maximum intensity value. In FIG. 3B, two pixels 312-313 have intensity values altered to the minimum intensity value and two pixels 314-315 have intensity values altered to the maximum intensity value. A two-dimensional graph of the pixel intensity values for the pixels of the small region 316 of an image with added salt-and-pepper noise is seen to exhibit a number of narrow spikes 318-321 corresponding to pixels with altered, or corrupted, intensity values. FIG. 3C illustrates Gaussian noise added to the small region of uniform pixel intensity shown in FIG. 3A. Gaussian noise may be modeled as the addition of a value of an independent Gaussian random variable, associated with each pixel, to the pixel intensity value of the pixel. In one convenient mathematical model, the Gaussian random variables are considered to be independent, and to be identically distributed. Actual Gaussian-like noise produced by various types of noisy channels may not exhibit independent and identical distributions of alterations in pixel intensities, but a model employing independent and identically distributed Gaussian random variables often serves as a reasonable approximation for different types of Gaussian-like noise, and provides a tractable and computable mathematical framework for analysis of the noise. A two-dimensional graph of the pixel intensity values of the small region of an image shown in FIG. 3A with added Gaussian noise shows random fluctuations 324 about an expected pixel intensity i 326 for the small region of the image 328.

A discrete universal denoiser for continuous-tone images ("DUDE-CTI") has been developed for general denoising of digitally encoded images, and other noisy data. The DUDE-CTI method is next described, both to establish a conceptual framework for the following description of the present invention, as well as to contrast the approach represented by the DUDE-CTI to the methods and denoisers of the present invention.

Figure 4A:
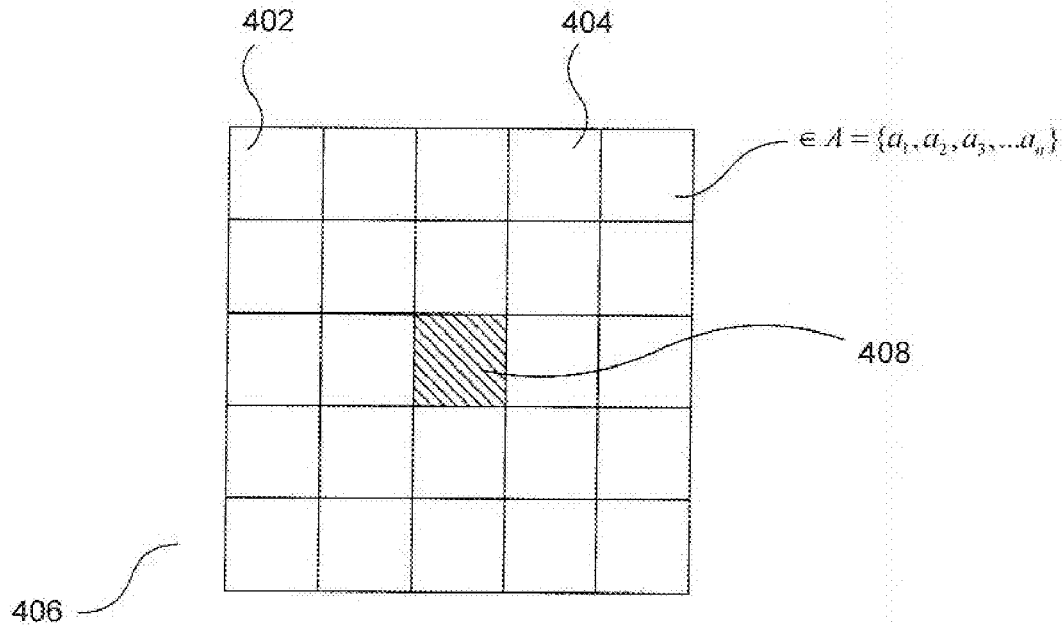
FIGS. 4A-B illustrate two different, well defined context neighborhoods that may be employed during analysis and denoising of image signals.
Figure 4B:
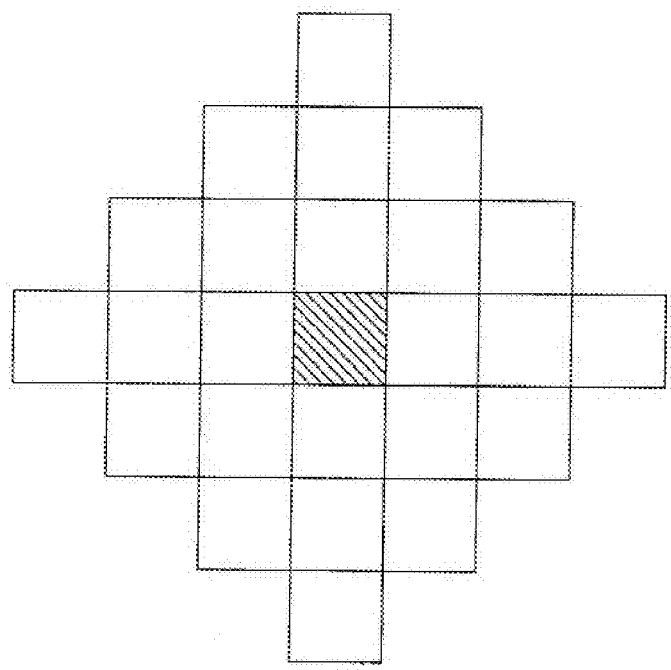

In both the DUDE-CTI and the context-based denoisers of the present invention, an image signal, or digitally encoded image, is considered to be a two-dimensionally-ordered sequence of symbols, each symbol mapped to one of a finite set of numerical values. Most of the symbols in a signal have well-defined two-dimensional contexts, or neighborhoods, and these contexts play a significant role in both the DUDE-CTI and the denoisers of the present invention. FIGS. 4A-B illustrate two different, well defined contexts that may be employed during analysis and denoising of image signals. Each square, such as square 402 in FIG. 4A, represents a single pixel intensity value within an image signal. As shown in FIG. 4A, the pixel intensity value associated with a pixel, such as the pixel intensity value associated with pixel 404, is considered during analysis and denoising as a symbol $z_i$ chosen from a finite alphabet $A = \{a_1, a_2, a_3, \ldots a_n\}$ where the index i indicates the order, or position, of the pixel within the signal. The pixel intensity value, or symbol $z_i$, associated with pixel i may be any one of the symbols in alphabet A. For common encodings of multi-level images, the symbols in A, $\{a_1, a_2, a_3, \ldots a_n\}$, are the unsigned, single byte values 0, 1, . . . , 255. In each of several passes, the DUDE-CTI and the denoisers of the present invention consider each symbol within a signal with respect to the symbol's context. The context 406 shown in FIG. 4A for a currently considered pixel, or central symbol, 408 comprises the pixel values contained in a 5×5 square region surrounding the currently considered pixel 408, but not including the currently considered pixel. In other words, the context for symbol 408 comprises the values of the 24 nearest symbol neighbors within the image signal containing currently considered symbol 408. In the discussion of the DUDE-CTI denoiser, the currently considered symbol, such as symbol 408 in FIG. 4A, is referred to as the "central symbol" of the context surrounding the symbol, but the context is not considered to include the central symbol.

Many different context shapes and sizes are possible. FIG. 48 shows an alternative 24-symbol context for an image signal. In general, the useful information content per symbol of a context may increase with increasing size up to a context size of maximum useful information per symbol, and then decrease with context sixes greater than the context size of maximum useful information per symbol. Analysis and denoising of noisy signals involves frequent context-based computations, with execution times increasing with increases in the context size employed in the analysis. Therefore, efficiency constraints may constrain context sizes to sizes, in symbols, below the maximum useful information per symbol size. Moreover, the maximum useful information per symbol context size may vary with the image signals being denoised.

Figure 5A:
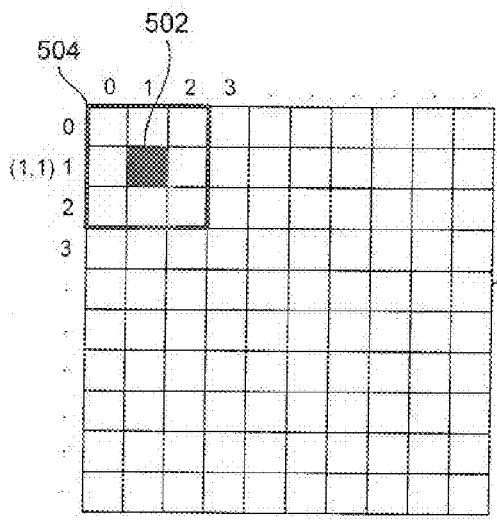
FIGS. 5A-D illustrate context usage during analysis and denoising of noisy signals.
Figure 5B:
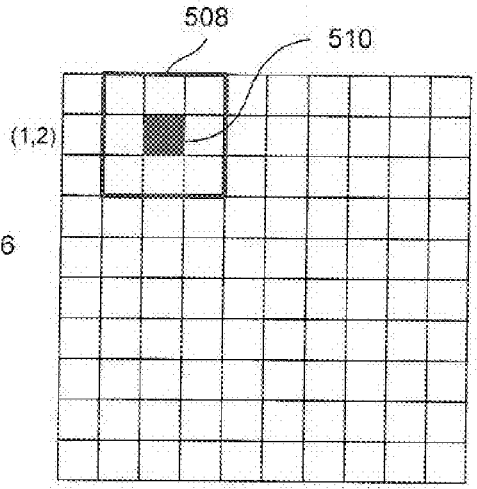
Figure 5C:
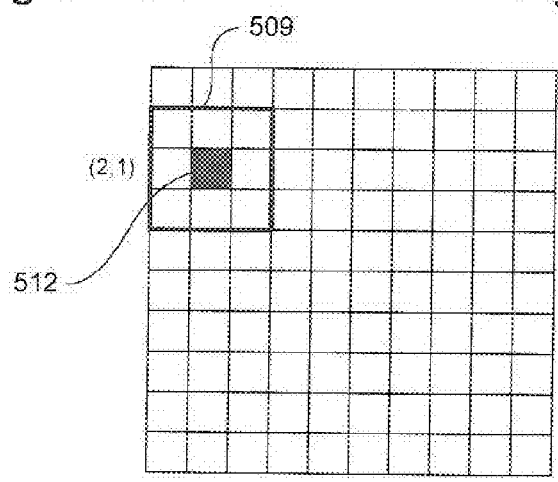
Figure 5D:
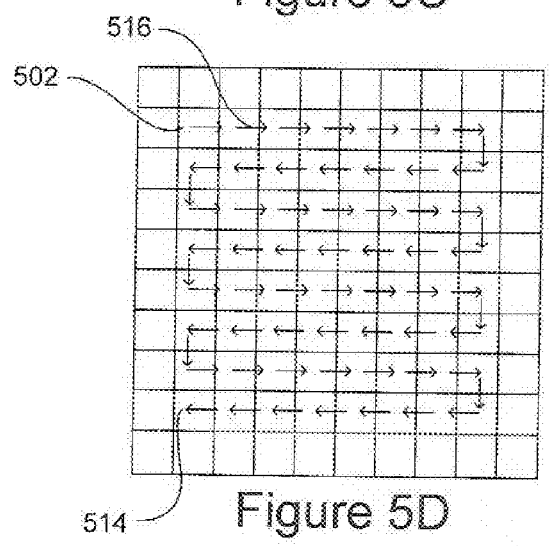

FIGS. 5A-D illustrate context usage during analysis and denoising of noisy signals. In FIG. 5A, the uppermost and leftmost symbol 502 with a full, 3×3 symbol context 504 within a small, square image 506 is shown. In certain types of analysis and denoising, special contexts are used for edge symbols, such as the first and last symbols of each row and column of the image. In other techniques, including the technique illustrated in FIGS. 5A-D, only symbols with full contexts are analyzed. FIGS. 5B and 5C show the 3×3 contexts 508 and 509 around the next rightmost symbol 510 and the next lowest symbol 512 with respect to symbol 502 in FIG. 5A. As shown in FIG. 5D, a given pass, or stage, of analysis or denoising may involve successive consideration of each full-context symbol within an image signal, starting with a first symbol 502 and proceeding to a final symbol 514. In FIG. 5D, small arrows, such as arrow 516, indicate each step of a pass in which each symbol is considered. In alternate techniques, all of the symbols within a signal may be considered, with specialized asymmetrical contexts employed for those symbols lacking a full context, or neighborhood.

Images are generally 2-dimensional data sets, and analysis and denoising methods for images therefore frequently use 2-dimensional contexts symmetrically disposed with respect to the central symbol. In other types of data sets, other types of contexts may be appropriate. For example, in digitally encoded text files, comprising essentially a one-dimensional series of symbols, a single length of symbols that, include the central symbol may be employed as a context. Other types of signals may profitably employ more complex, non-contiguous or higher-dimensional contexts.

Figure 6:
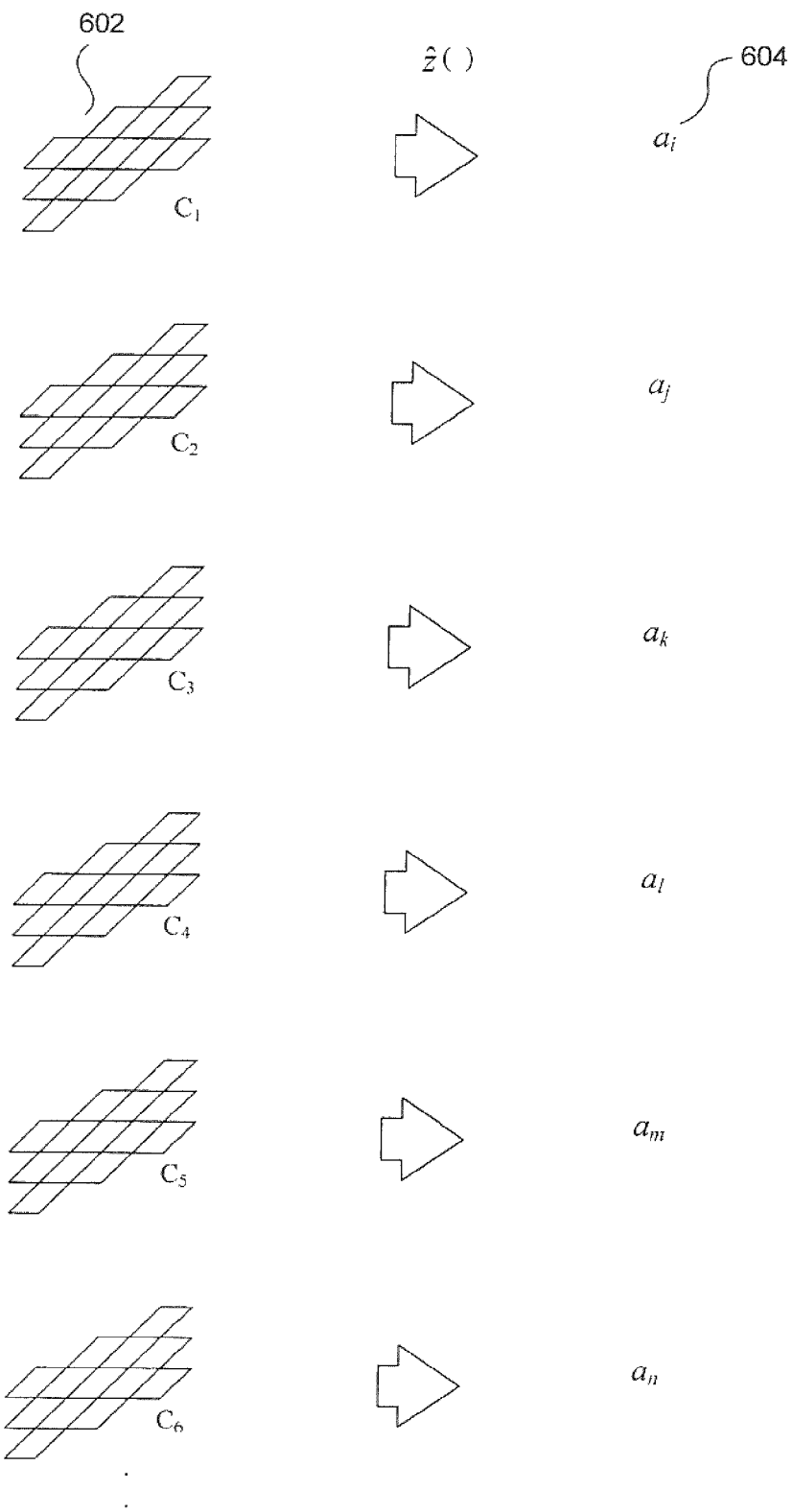
FIG. 6 illustrates the predictor function $\hat{z}(\ )$.

The DUDE-CTI method employs a central-symbol predictor function $\hat{z}(\ )$. FIG. 6 illustrates the predictor function $\hat{z}(\ )$. As illustrated in FIG. 6, the $\hat{z}(\ )$ function receives, as a sole argument, a context, such as context $C_1$ 602 in FIG. 6, from a noisy signal and returns a symbol 604 predicted to be the central noisy symbol. In other words, as shown in FIG. 6, for each possible context that may occur in a noisy signal, the predictor functions $\hat{z}(\ )$ returns a corresponding central symbol for the context.

Figure 7:
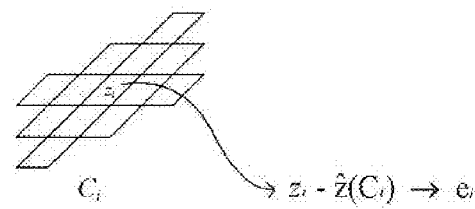
FIG. 7 illustrates computation of an error $e_i$ for a symbol $z_i$ observed within a context $C_i$ in noisy signal.

The DUDE-CTI method computes an error $e_i$ for each symbol $z_i$ in the noisy signal as the difference between the observed symbol $z_i$ and the symbol predicted by the predictor function $\hat{z}(\ )$ for the context $C_i$ for the symbol $z_i$. FIG. 7 illustrates computation of an error $e_i$ for a symbol $z_i$ observed within a context $C_i$ observed in a noisy signal.

Figure 8:
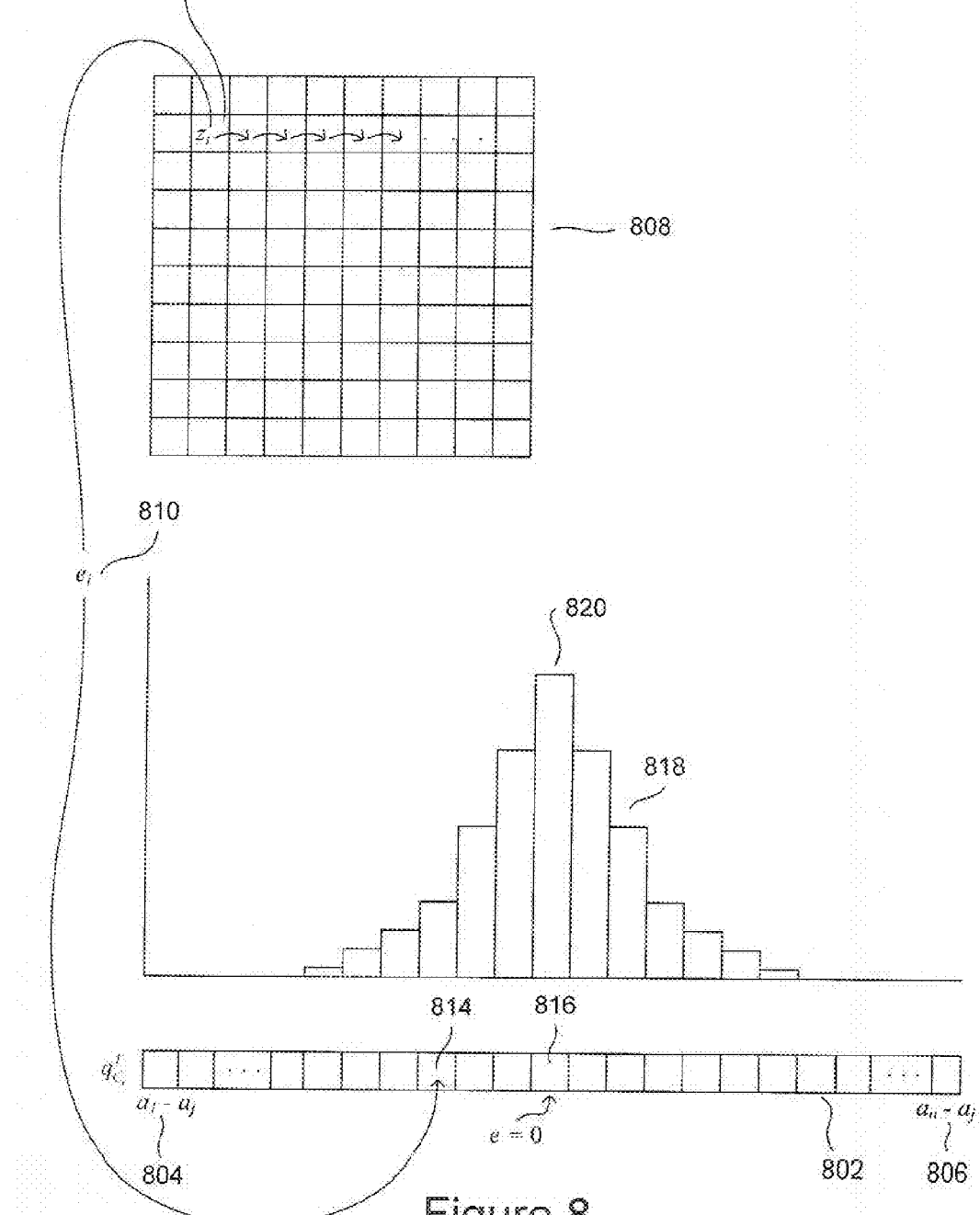
FIG. 8 illustrates accumulation of error information for a particular context during analysis of a noisy image signal.

FIG. 8 illustrates accumulation of error information for a particular context during analysis of a noisy image signal. The error-information accumulation in FIG. 8 is context specific. As discussed later, more efficient DUDE-CTI implementations use cluster-specific error-information accumulation. As shown in FIG. 8, a data structure, or vector, $q_{C_i}^T$ 802 is maintained for each possible context $C_i$ in order to count the occurrences of different possible error values computed for the context $C_i$ during analysis of a noisy image signal. If the predictor function $\hat{z}(C_i)$ predicts the symbol $a_j$ for context $C_i$, then, according to the error equation $e_i=z_i-\hat{z}(C_i)$, the error values that can be computed for context $C_i$ range from $a_j$-$a_j$ 804 to $a_n$-$a_j$ 806.

In a first pass of the DUDE-CTI denoiser, each symbol in a noisy image signal 808 is considered, and the error for each considered symbol is tabulated in the appropriate vector $q_C^T$ for that symbol. For example, in FIG. 8, an error $e_i$ 810 is computed from the first considered symbol $z_i$ 812 and associated context $C_i$, and the computed error $e_i$ is used to compute the position of a counter 814 within the vector $q_{C_i}^T$ 802 that is updated, to reflect the occurrence of error $e_i$ in the noisy image signal 808. The computed error $e_i$ 810 can be viewed as being offset from a counter 816 within the vector $q_{C_i}^T$ 802 corresponding to a computed error of 0. As each symbol is considered during the first pass of the DUDE-CTI method, the vector $q_C^T$ corresponding to the observed context of the symbol is updated to reflect the occurrence of the error $e$ computed from the symbol and context observed for the symbol within the noisy image signal. After the first, pass of the DUDE-CTI method, each vector $q_C^T$ generally stores a histogram more or less symmetrically disposed about the counter within the vector $q_C^T$ corresponding to a computed error value $e$ of 0. For example, in FIG. 8, the contents of the counters within vector $q_{C_i}^T$ 802 are plotted above the vector $q_{C_i}^T$ in a two-dimensional plot 818, and form a histogram with a central, highest peak 820 corresponding to the counter 816 within vector $q_{C_i}^T$ 802 representing a computed error of 0. In other words, the symbol predicted by the predictor function $\hat{z}(\ )$ for a given context $C_i$ is generally the symbol most often observed within the context $C_i$ in the noisy signal. Thus, following the first pass of the DUDE-CTI denoiser method, histograms of observed errors for each context are collected.

Unfortunately, when contexts of even modest size are used, a typical image will not contain a sufficient number of occurrences of each context to collect reliable, well-formed histograms of error occurrences, such as the histogram shown in FIG. 8. For this reason, the DUDE-CTI method employs context clustering in order to collect sufficient numbers of error occurrences for each context.

Figure 9:
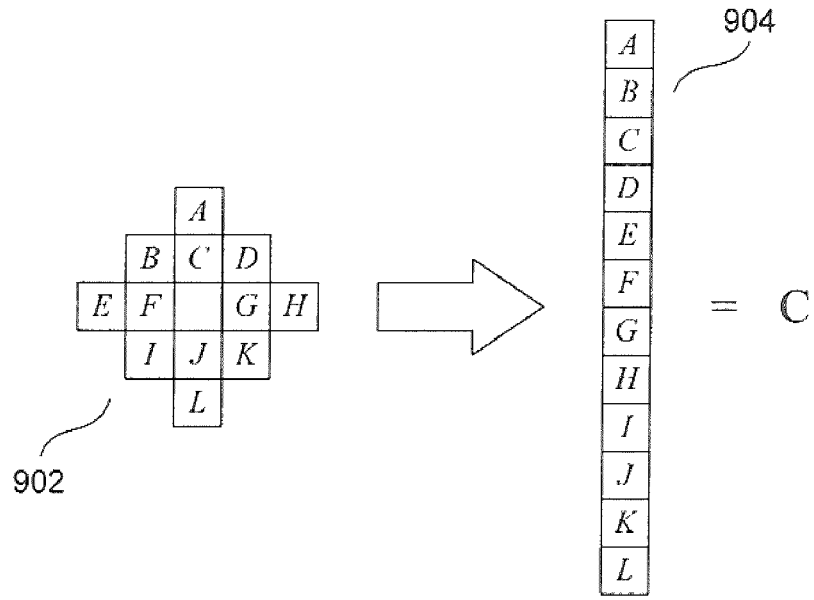
FIG. 9 illustrates a context vector.

FIG. 9 illustrates a context vector. It is convenient to consider context vectors for the mathematical steps of the DUDE-CTI method. As shown in FIG. 9, the symbols that occur within a context 902 may be ordered into a vector 904 according to some ordering method that is uniformly applied to all contexts. In FIG. 9, symbols A-L from 2-dimensional context 902 are re-ordered into a column vector 904 by a left-to-right, top-down traversal of the 2-dimensional context 902. The ordering method is arbitrary, and different ordering methods may be mathematically or programmatically convenient for different types of contexts. A context vector may be considered to be a row vector or a column vector, depending on conventions chosen for the analysis using the context vector. In other words, the convention is arbitrary.

Figure 10:
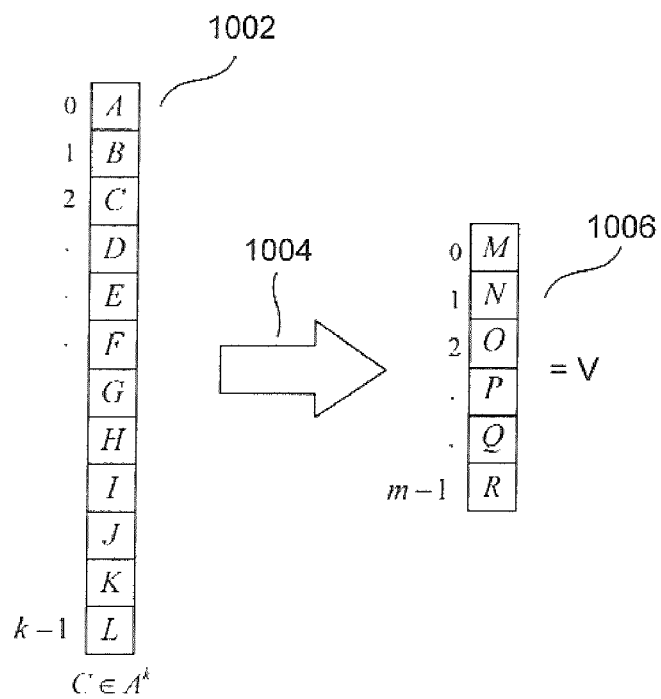
FIG. 10 illustrates a context-vector to cluster-index mapping.

Context clustering can be thought of as a many-to-one mapping, or binning, of context vectors in a context-vector space into a set of context-cluster indices. FIG. 10 illustrates a context-vector to cluster-index mapping. In FIG. 10, a context vector 1002 $C \in A^k$ of dimension k is mathematically transformed 1004 to a cluster index V 1006 with a range of values expressible using a sequence of m symbols over some alphabet (e.g. binary), where m is less than die dimension k of the context vector.

Figure 11:
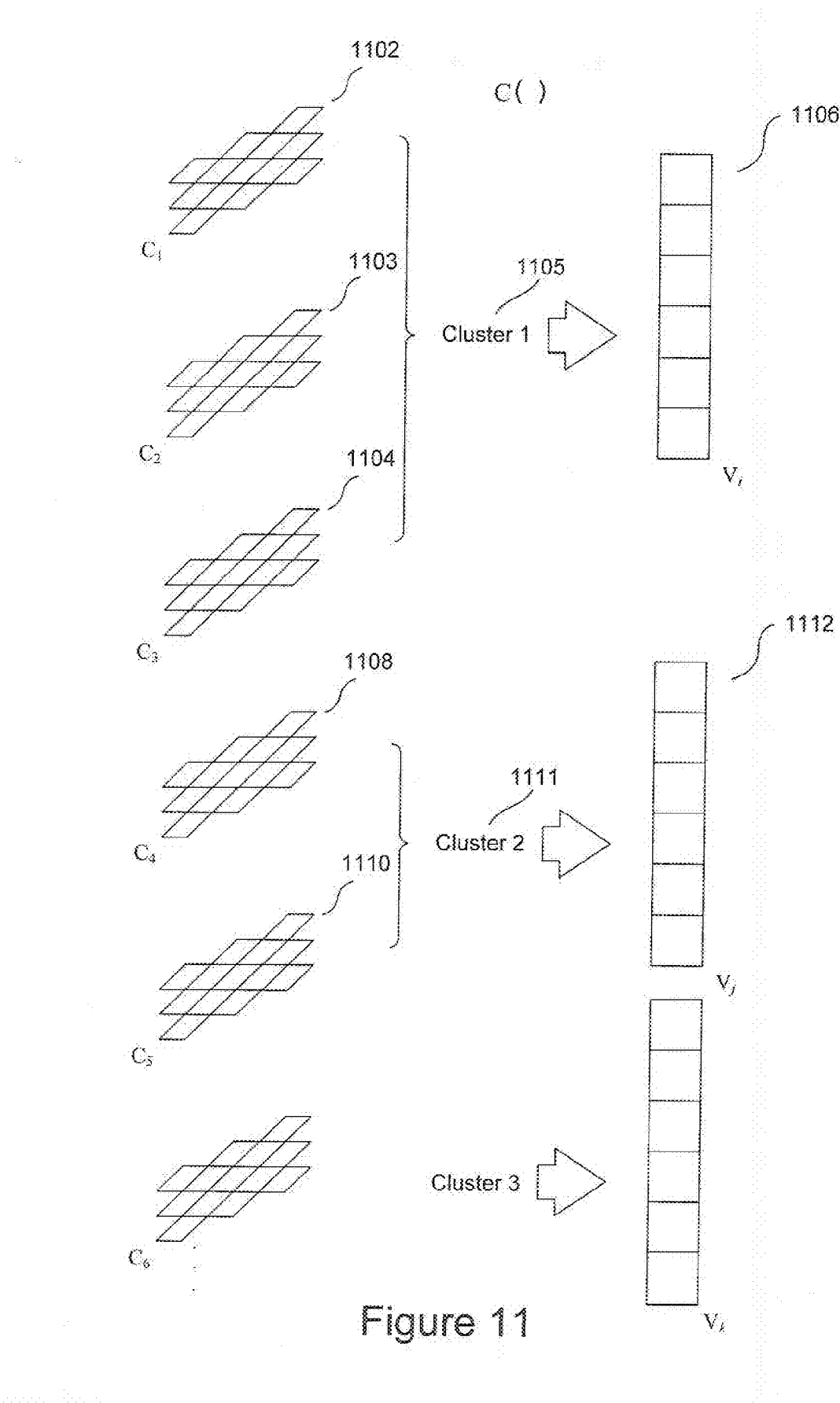
FIG. 11 illustrates a context-clustering function $C(\ )$ used by various embodiments of the DUDE-CTI denoising method.

FIG. 11 illustrates a context-clustering function $C(\ )$ used by various embodiments of the DUDE-CTI denoising method. As shown in FIG. 11, the context-clustering function $C(\ )$ maps a given context, supplied as a sole argument, that is expected to produce a particular type of error histogram to a particular cluster to which other contexts that are expected to produce similar error histograms may be mapped. The context is, in turn, mapped to a cluster index. Multiple, contexts are generally mapped to any given cluster by the context-clustering function $C(\ )$. For example, in FIG. 11, three contexts 1102-1104 are mapped by the context-clustering function $C(\ )$ to Cluster 1 1105, in turn mapped to, or associated with, cluster index $V_i$ 1106. Similarly, contexts 1108 and 1110 are both mapped by the context-clustering function $C(\ )$ to Cluster 2 1111, in turn mapped to, or associated with, cluster index $V_j$ 1112. The number of contexts mapped to any particular cluster may vary, depending on the context-clustering function $C(\ )$. Any particular DUDE-CTI embodiment may use any of a number of different context-clustering functions, although suitable context-clustering functions generally have the property of mapping contexts expected to produce similarly shaped error histograms, such as the error histogram shown in FIG. 8, to a common cluster. In other words, all the contexts mapped to any particular cluster by a suitable context-clustering function would produce similarly shaped error histograms were the first pass of the DUDE-CTI method executed on a sufficiently large noisy image signal to collect sufficient occurrence counts of errors for each context to generate well-formed histograms for each context.

Figure 12:
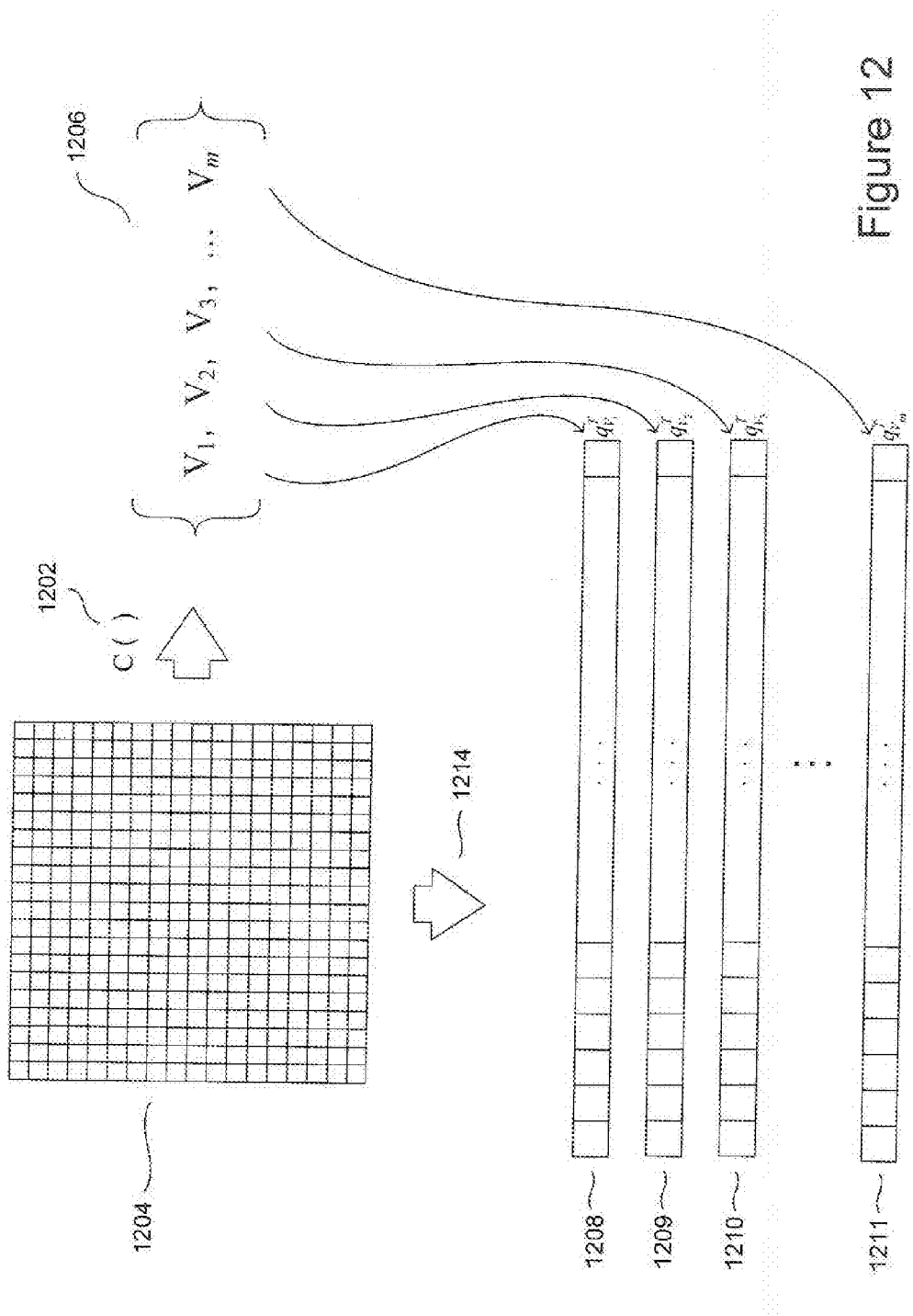
FIG. 12 illustrates the use of clustering by the DUDE-CTI method during a first pass, in which error histograms are prepared.

FIG. 12 illustrates the use of clustering by the DUDE-CTI method during a first pass, in which error histograms are prepared. As shown in FIG. 12, a context-clustering function $C(\ )$ 1202 is employed to map contexts occurring within a noisy image signal 1204 to a set of clusters 1206. Then, an occurrence-count vector $q_{V_i}^T$ 1208-1211 is instantiated and initialized for each possible cluster $V_i$. Finally, each symbol in the noisy image signal 1204 is analyzed 1214 in the first pass to compute and tabulate the occurrence of computed errors, on a cluster-by-cluster basis. The errors are computed as discussed above, with reference to FIGS. 7 and 8, except that all errors observed for all contexts that belong to a given cluster $V_i$ are commonly tabulated together in the vector $q_{V_i}^T$ for that cluster, rather than being separately tabulated in context-associated vectors $q_C^T$, as was done in FIG. 8. Thus, clustering allows a much larger number of error occurrences to be tabulated together in each histogram generated during analysis of a given noisy image signal. However, common tabulation of error occurrences in cluster-associated vectors $q_V^T$ is only meaningful if the shapes of the error histograms that would be separately produced for all contexts associated with the cluster are similar.

Figure 13:
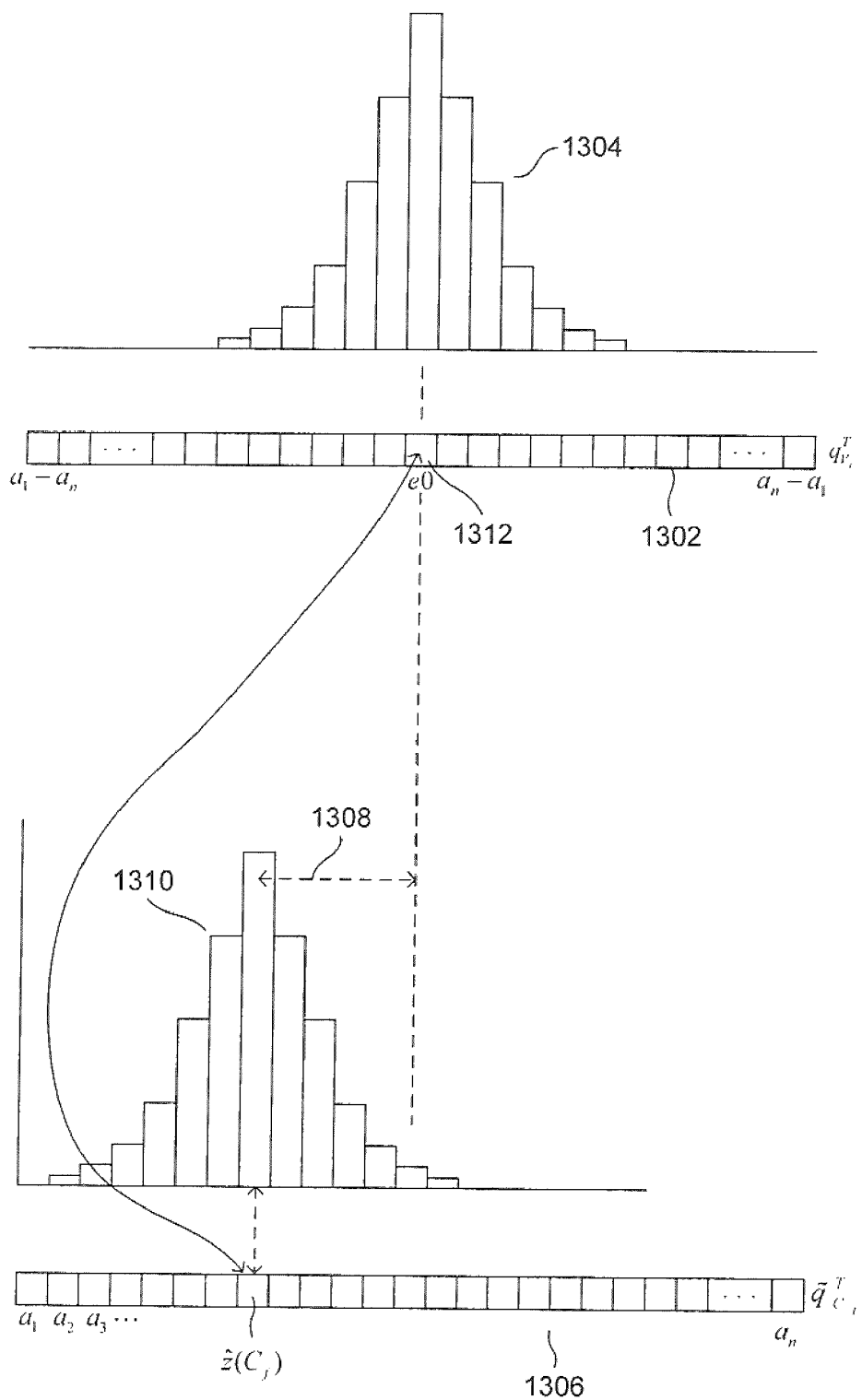
FIG. 13 illustrates generation of context-specific symbol-occurrence probability distributions $q_C^T$ from cluster-associated error-occurrence vectors $q_r^T$ collected during the first pass of a cluster-based DUDE-CTI method.

FIG. 13 illustrates generation of context-specific symbol-occurrence probability distributions $\tilde{q}_C^T$ from cluster-associated error-occurrence vectors $q_V^T$ collected during the first pass of a cluster-based DUDE-CTI method. In FIG. 13, a cluster-associated error-occurrence vector $q_{V_j}^T$ 1302 is shown at the top of the diagram, along with a histogram plot 1304 of the values stored in the counters within the cluster-associated vector $q_{V_j}^T$, using the illustration convention employed in FIG. 8. A context-specific symbol-occurrence probability distribution $\tilde{q}_{C_j}^T$ for a context $C_j$ associated with cluster $V_j$ 1304 is generated in FIG. 13 by copying the contents of the cluster-associated error-occurrence vector $q_{V_j}^T$ 1302 into the counters of context-associated context-specific symbol-occurrence probability distribution $\tilde{q}_{C_j}^T$. However, rather than copying the error-occurrence counts from cluster-associated vector $q_{V_j}^T$ into corresponding counters of context-associated context-specific symbol-occurrence probability distribution $\tilde{q}_{C_j}^T$, each copy involves an offset 1308, so that the context-specific probability distribution 1310 is centered about the symbol value $\hat{z}(C_j)$ predicted by the predictor function for the context, rather than centered at the position 1312 corresponding to a computed error of 0 in the cluster-specific histogram 1304. In other words, the final, context-specific vector $\tilde{q}_{C_j}^T$ represents a probability distribution for the occurrences of symbols at $a_1, a_2, \ldots a_n$ an from the alphabet A for all occurrences of the context $C_j$ in the noisy image signal, estimated from the probability distribution observed for the cluster to which the context is mapped by the context-clustering function $C( )$. The copy operation may therefore be accompanied by a normalization, to provide a normalized, estimated probability distribution, and a domain-related adjustment, since the domain of $q_{V_j}^T$ is generally twice as large as the symbol alphabet size n, which is the domain of $\tilde{q}_{C_j}^T$. Thus, the error-occurrence counts tabulated in common for each cluster are used to generate specific symbol-occurrence probability distributions $\tilde{q}_{C_j}^T$ for each context $C_j$.

Next, the DUDE-CTI denoiser generates a function $g(C, z)$ that computes a replacement symbol $\hat{x}$ for a given central symbol z that occurs within context C observed in the noisy image signal. The replacement function $g( )$ can then be used in a second, symbol-by-symbol pass, to replace each symbol in the noisy image signal with a corresponding replacement symbol. The symbol replacement for each symbol in the noisy image signal is carried out independently. In other words, the contexts applied to the replacement function $g( )$ are the contexts observed in the noisy image signal, rather than partially symbol-replaced contexts. It should be noted that, in many cases, the replacement symbol $\hat{x}$ is identical to the corresponding observed symbol z in the noisy image signal.

Computation of the replacement function $g( )$ involves use of two matrices: (1) a matrix $\pi$ that represents a channel-noise model for the noise-inducing channel that generates symbol differences between the initial, clean image signal and the noisy image signal; and (2) a distortion matrix $\Lambda$ that represents the distortions in a recovered image produced by substituting for symbol $a_i$ in the corresponding clean image signal any of the symbols $a_1, a_2, \ldots a_n$, in alphabet A.

Figure 14:
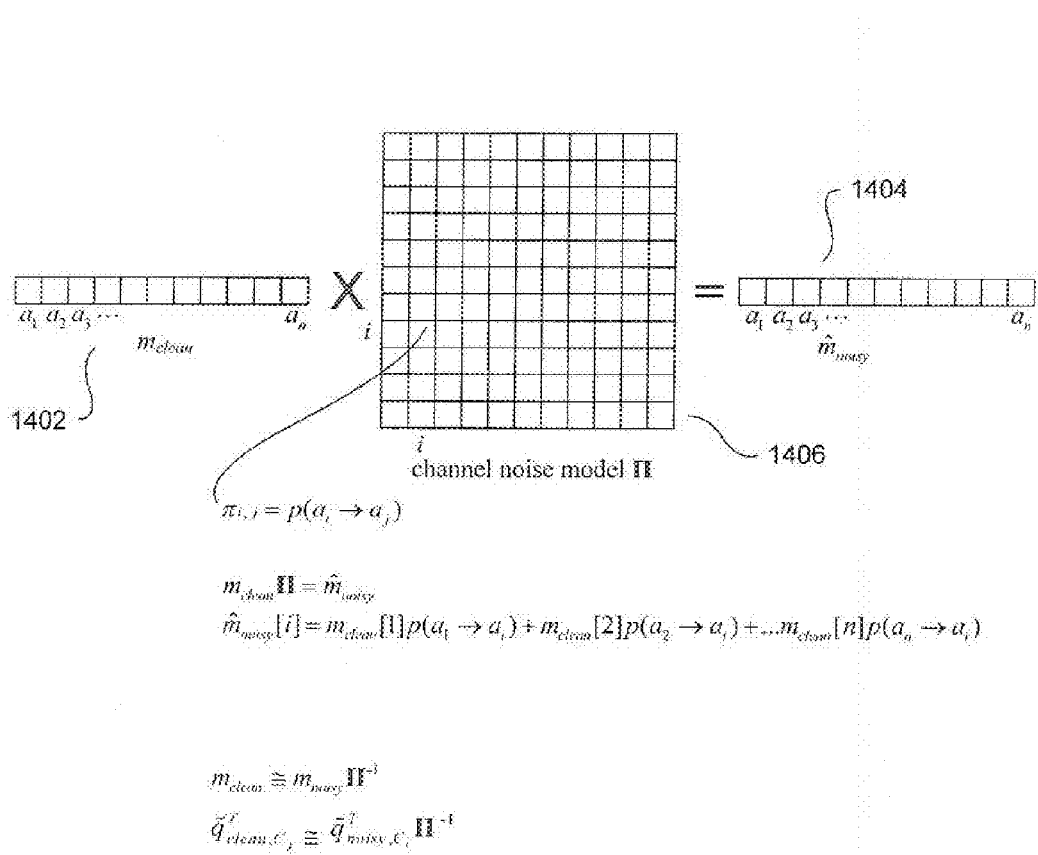
FIG. 14 illustrates a channel-noise-model matrix $\pi$.

FIG. 14 illustrates a channel-noise-model matrix $\pi$. In FIG. 14, the row vector $m_{clean}$ 1402 contains counts of the occurrences of each symbol in alphabet A within the clean, original image signal. The row vector $m_{clean}$ is indexed by symbols from the alphabet A, $a_1, a_2, a_3, \ldots$. A corresponding row vector $m_{noisy}$, contains the counts of occurrences of the symbols of the alphabet A in the noisy image signal. Multiplication of the row vector $m_{clean}$ by the channel-noise-model matrix $\pi$ 1406 produces a derived row vector $\hat{m}_{noisy}$ 1404. Each element $\pi_{i,j}$ of the channel-noise-model matrix $\pi$ contains the probability of the transition of the symbol $a_i$ to the symbol $a_j$ as the clean signal passes through the noisy channel modeled by the channel-noise-model matrix $\pi$. In mathematical terms:

$$m_{clean}\pi = \hat{m}_{noisy}$$

$$\hat{m}_{noisy}[i] = m_{clean}[1]p(a_1 \to a_i) + m_{clean}[2]p(a_2 \to a_i) + \ldots + m_{clean}[n]p(a_n \to a_i)$$

The derived vector $\hat{m}_{noisy}$ 1404 is expected to be fairly close, relative to the signal size, to the vector $m_{noisy}$ containing counts of symbols observed in a noisy signal. Provided that the channel-noise-model matrix $\pi$ is invertible, or an approximate or pseudo inverse of the matrix $\pi$ can be obtained by any of a number of matrix inversion methods, an observed vector $m_{noisy}$ including the counts of occurrences of symbols observed in a noisy signal can be multiplied by the inverse of the channel-noise-model matrix $\pi$ to produce approximate estimates of the counts of occurrences of symbols in the clean signal:

$$m_{clean} \cong m_{noisy}\pi^{-1}$$

This approximation technique can be extended to vectors $\tilde{q}_{C_j}^T$ that include the derived probabilities of occurrences of symbols of the alphabet A observed in contexts $C_j$ in the noisy signal to produce estimates of probabilities of occurrence of symbols in the alphabet A in the clean signal corresponding to occurrences of the context $C_j$ in the noisy signal by multiplication of $\tilde{q}_{C_j}^T$ by the inverse of the channel-noise-model matrix $\pi$, as follows;

$$\tilde{q}_{clean,C_j}^T \cong \tilde{q}_{C_j}^T \pi^{-1}$$

Figure 15:
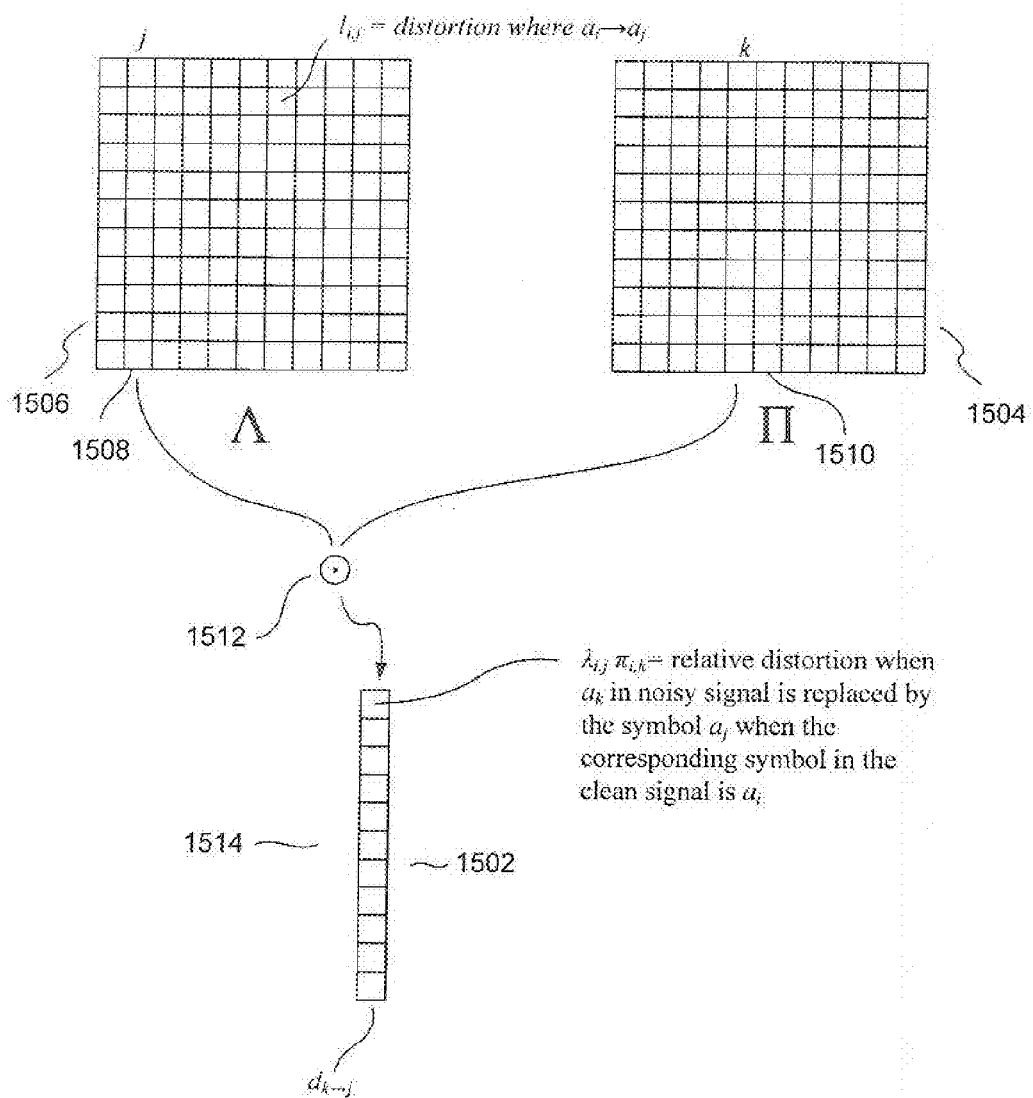
FIG. 15 illustrates construction of a relative distortion vector for replacement of a symbol $a_k$ a noisy signal by a symbol $a_j$.

FIG. 15 illustrates construction of a relative distortion vector that numerically expresses the distortion expected from replacement of a symbol $a_k$ in a noisy signal by a symbol $a_j$. Construction of a relative distortion vector 1502 involves a column of the channel-noise-model matrix $\pi$ 1504, discussed above with reference to FIG. 14, as well as a column from the distortion matrix $\Lambda$ 1506. Each element $\lambda_{i,j}$ in the distortion matrix $\lambda$ contains a numerical estimate of the distortion produced in an image when the symbol $a_i$ in the clean signal is replaced by the symbol $a_j$ in the noisy signal. When a column j 1508 is selected from the distortion matrix $\Lambda$ and a column k is selected from the channel-noise-model matrix $\pi$ 1510, and the selected columns $\lambda_j$ and $\pi_k$ are combined by the Schur product operation 1512, the distortion vector $d_{k \to j}$ 1514 is produced. The Schur product is carried out by the multiplication of each element in the column $\lambda_j$ by the corresponding element in the $\pi_k$ column. Each element of the distortion vector $d_{k \to j}$, $\lambda_{i,j}$, $\pi_{i,k}$, includes a numerical estimate of the relative distortion produced when symbol $a_k$ in a noisy signal is replaced by the symbol $a_j$ when the corresponding symbol in the clean signal is $a_i$.

FIG. 16 illustrates the computation of an estimate of the distortion produced by replacing symbol $a_k$ within context C in a noisy signal by the replacement symbol $a_j$. This distortion value is obtained by the inner product of the row vector $\tilde{q}_{clean,C}^T$ 1602 by the distortion column vector $d_{k \to j}$ 1604. Note that the row vector $\tilde{q}_{clean,C}^T$ is obtained, as discussed above, by multiplying the derived row vector $\tilde{q}_C^T$ by the inverse of the channel-noise-model matrix $\pi$. Therefore, as shown in FIG. 16, a numerical estimate of the distortion produced by replacing the symbol $a_k$ within context C in a noisy signal by the symbol $a_j$ can be obtained entirely from the derived symbol occurrence frequencies within the noisy signal, the distortion matrix $\Lambda$, and the channel-noise-model matrix $\pi$ and its inverse $\pi^{-1}$.

FIG. 17 illustrates a symbol-replacement function $g(C,z)$. The symbol-replacement function $g(C,z)$ computes a replacement symbol for an observed central symbol z within an observed context C. The observed central symbol and context are supplied as arguments to the symbol-replacement function g(C,z). The function g( ) considers each possible replacement symbol value for the central symbol of the context C and returns the estimated minimally distorting replacement character $\hat{x}$, where, for a given observed central symbol z within an observed context C:

$$\hat{x} = g(C, z) = \frac{\arg\min}{a_j : j = 1 \text{ to } n}(\hat{d}_{z \to a_j})$$

where, for $z=a_i$, $\hat{d}_{z \to a_j} = \hat{d}_{a_i \to a_j} = \tilde{q}_{clean,C}^T \cdot d_{i \to j}$ Thus, the symbol-replacement function g( ) produces a replacement character $\hat{x}$ for an observed central symbol z within a context C observed in the noisy signal.

EMBODIMENTS OF THE PRESENT INVENTION

Figure 18:
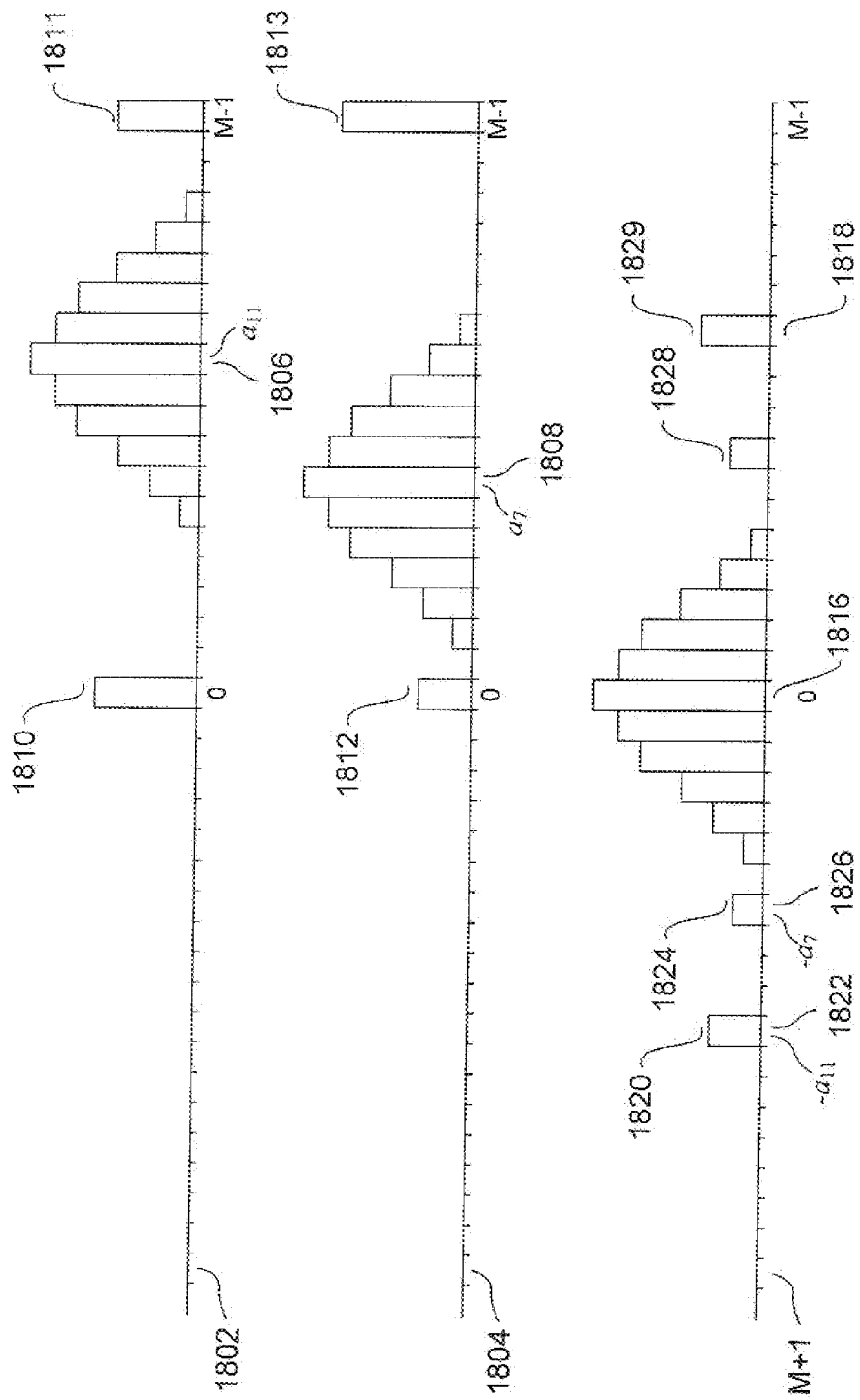
FIG. 18 illustrates a source of prediction-error-statistics distortions that may arise when prediction errors are accumulated over multiple contexts of a context class.

While accumulation of prediction-error statistics for context classes, rather than for individual contexts, may provide sufficient observables to accurately derive context-specific conditional probability distributions, the accumulation of statistics over context classes may suffer significant distortion in the case of images, and other data sets, that include significant noise, including salt-and-pepper noise and M-ary symmetric noise. FIG. 18 illustrates a source of prediction-error-statistics distortions that may arise when prediction errors are accumulated over multiple contexts of a context class. FIG. 18 shows, in a first pair of histograms 1802 and 1804, the frequency of occurrence of symbols observed for a first context $C_1$ and a second context $C_2$, respectively, in an exemplary noisy image. In the case of the first context $C_1$, the symbol $a_{11}$ (1806 in FIG. 18) is most frequently observed, with the frequency of occurrence of adjacent symbols generally decreasing in both directions with respect to distance of the adjacent symbols from the symbol $a_{11}$ along a sequence of symbols ordered by numeric value. Similarly, the symbol $a_7$ (1808 in FIG. 18) is most frequently observed for context $C_2$. In both cases, the presence of salt-and-pepper noise contributes isolated peaks 1810-1813 corresponding to symbol $a_0$ and symbol $a_{M-1}$.

A falloff in symbol-occurrence for symbols increasingly distant from the most frequently observed symbol is expected when the symbol value of the symbols embedded within a particular context depends on that context and when the dependency results, in a single-peaked distribution of observed symbol frequencies about the most frequently observed symbol. In other words, the context or neighborhood of a symbol is associated with a probability distribution for the values of symbols that occur within the context, where the probability distribution is a familiar Gaussian-like or skewed distribution with a single peak. However, this is not true for noise corrupted symbols embedded within the context. As an example, for salt-and-pepper noise, which replaces clean-image symbols with either the symbol $a_0$ or the symbol $a_{M-1}$, the frequency of occurrence of $a_0$-valued and $a_{M-1}$-valued symbols is not context dependent, and thus the bell-shaped curve-like distributions for symbol-occurrence frequency within contexts may be distorted by noise. The noise contribution to the symbol-occurrence frequency may not decrease with increasing distance from the most frequently observed symbol.

When the observed symbol frequencies, in the two histograms 1802 and 1804 for contexts $C_1$ and $C_2$, respectively, are tabulated as error statistics in prediction-error histogram 1818, as discussed above, with the errors computed as $e_i=z_i-\hat{z}(C_i)$, the prediction error distribution is centered at the position 0 1816. However, the isolated peaks 1810-1813 corresponding to salt-and-pepper noise end up, in the combined error statistics, distributed as smaller peaks over a range of computed prediction-error values. For example, peak 1810 becomes, in the error-statistics histogram 1818, peak 1820, at position $-\alpha_{11}$ (1822 in FIG. 18) while peak 1812 in the histogram for context $C_2$ becomes peak 1824 in the error-statistics histogram 1818 at position $-\alpha_7$ (1826 in FIG. 18). Similarly, peaks 1811 and 1813 become peaks 1828 and 1829, respectively. However, both peaks 1810 and 1812 correspond to the $a_0$ salt-and-pepper-noise value in the symbol-occurrence histograms. When the statistics for a larger number of contexts belonging to a particular context class are accumulated together, with the context classes having various different expected values for the central symbol of the distribution of symbol-occurrence frequency, the salt-and-pepper peaks in the symbol-occurrence histograms may end up distributed across a relatively broad range of values at tails of the distribution of prediction-error values. It is difficult to determine, based on accumulated, observed statistics, whether or not these values, in the prediction-error-histogram, correspond to salt-and-pepper noise, or instead correspond to legitimate variations in the pixel values within the clean image.

Since clean-symbol prediction is based on the accumulated prediction-error statistics, and since these prediction-error statistics may be significantly distorted by non-additive noise, such as salt-and-pepper noise, as discussed with reference to FIG. 18, a universal denoiser generally carries out various steps, after statistics collection, to detect and address distortions that occur as a result of non-additive noise in the noisy data set. Methods and systems of the present invention provide a new approach to universal denoising of images and other data sets for which context-class-based statistics accumulation is used in order to accumulate sufficient observations to provide statistical significance. The new approach, represented by embodiments of the present invention, accumulates error statistics, during the statistics-gathering phases of denoising, in a way that largely prevents, or greatly ameliorates, the types of non-additive-noise distortions discussed above with reference to FIG. 18.

Next, prior to providing detailed control-flow diagrams of an embodiment of the present invention, aspects of the denoising methods and systems that represent embodiments of the present invention are discussed with reference to FIGS. 19-30, which graphically illustrate these aspects of embodiments of the present invention. The discussion of these aspects of the method and systems of the present invention provides a conceptual basis for understanding the control-flow diagrams that follow.

Figure 19:
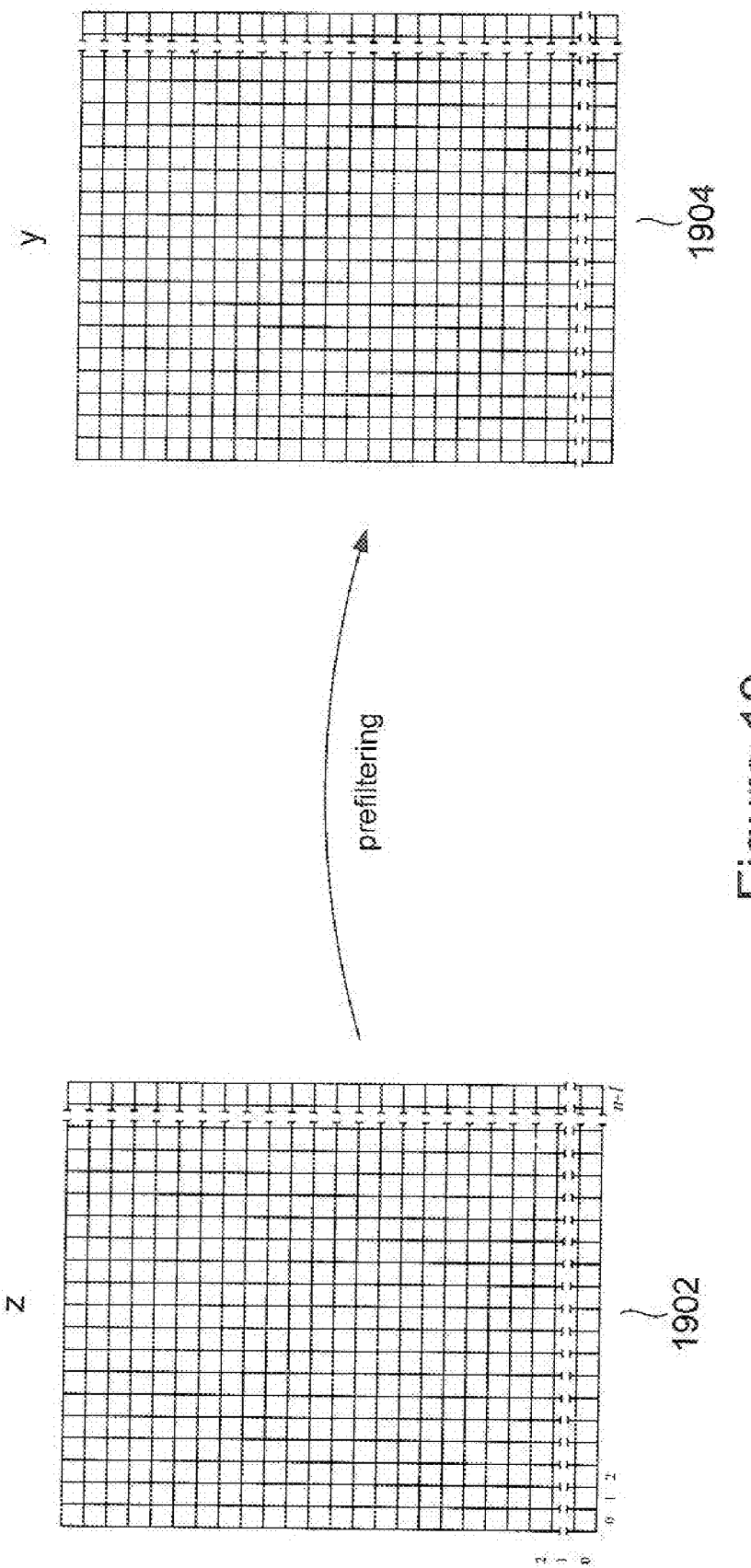
FIG. 19 illustrates an initial step in a discrete-universal denoising method that represents an embodiment of the present invention.

FIG. 19 illustrates an initial step in a discrete-universal denoising method that represents an embodiment of the present invention. In the current discussion, the noisy data set on which methods of the present invention operate is considered to be a two-dimensional image, denoted as z, with elements $z_i$. However, any of various different types of one-dimensional and higher-dimensional datasets may be denoised by iterative denoisers that include embodiments of the present invention. In FIG. 19, the noisy image z 1902 is shown on the left side of the figure. The two-dimensional noisy image can be considered to be a two-dimensional matrix, with elements z(i,j) where i is a row index and j is column index. However, a two-dimensional image can be alternatively considered to be a one-dimensional vector z with elements $z_i$. For example, rows, of the two-dimensional image may be concatenated together, in row order, to produce the vector z. When convenient, noisy image z may be treated as a two-dimensional matrix, or, at other times, treated as a one-dimensional vector, with the notation z and $z_i$ used for both. The same convention is used for describing filtered, denoised, and clean images and contexts within images.

In an initial step in certain denoising methods, a noisy image z is filtered to produce a prefiltered, noisy image y 1904. Both z and y generally have the same number of elements. The prefiltering step can be carried out in a variety of different ways. In one approach, a neighborhood, or context, about each pixel is considered, and a prefiltered-image symbol $y_i$ is generated from the image-element values, or pixel values, in a context or neighborhood surrounding each noisy-image pixel $z_i$ using one of various different filtering methods. The filtering methods can be described as computing the prefiltered-image symbol $y_i$ corresponding to noisy-image symbol $z_i$ as a function of the neighborhood $\eta_i$ about noisy-image symbol $z_i$, and of the symbol $z_i$ itself:

$$y_i = f(\eta_i, z_i)$$

where $\eta_i$ is the neighborhood of element $z_i$ in noisy image z. Prefiltering generally removes or ameliorates certain types of noise corruption in a noisy image. One example of a prefiltering function is a function that averages all of the values of image elements in the neighborhood of noisy-image element $z_i$ to compute corresponding prefiltered-image symbol $y_i$. An averaging type of prefiltering may be effective for certain types of images, but may be deleterious for others, including images that contain sharp detail and high-contrast features, such as edges. In certain cases, an appropriate prefiltering function may be selected, by method embodiments of the present invention, based on criteria that depend on the type of noisy image z that is sought to be denoised. The prefiltered image y is primarily used for generating context classes, symbol prediction, and bias estimation for prediction classes.

Figure 20:
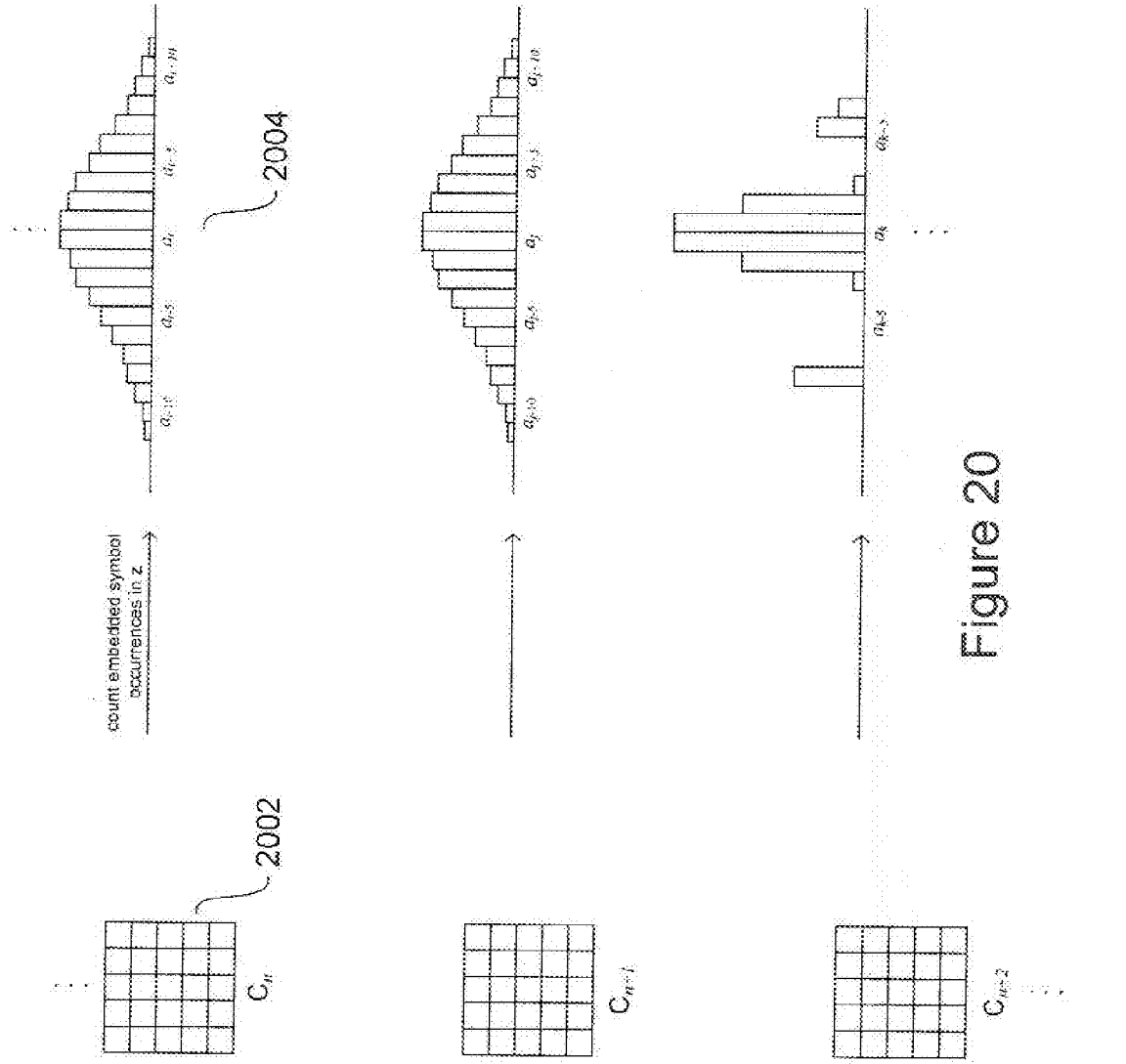
FIGS. 20-22 illustrate the concept of prediction classes and conditioning classes, employed in method and system embodiments of the present invention.
Figure 21:
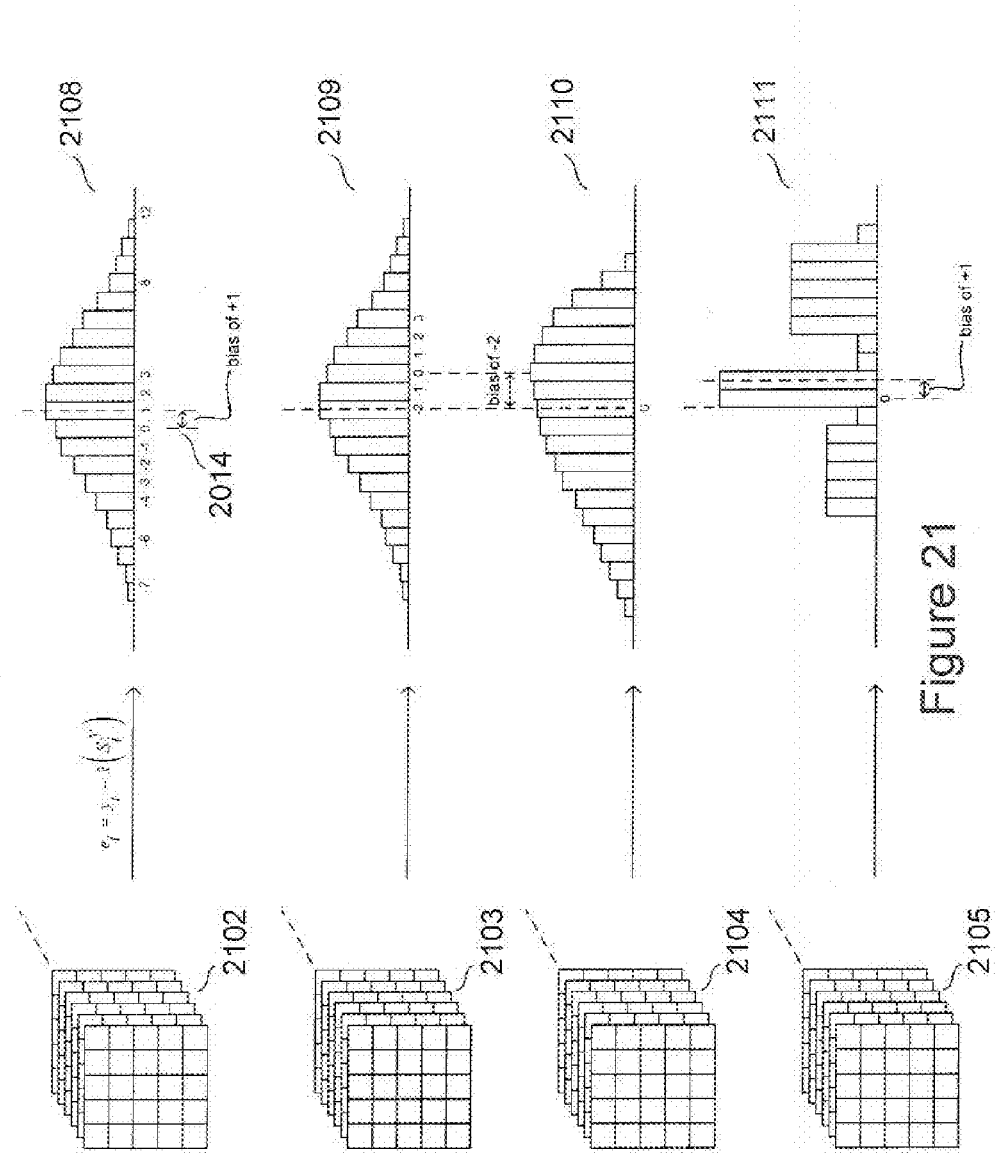
Figure 22:
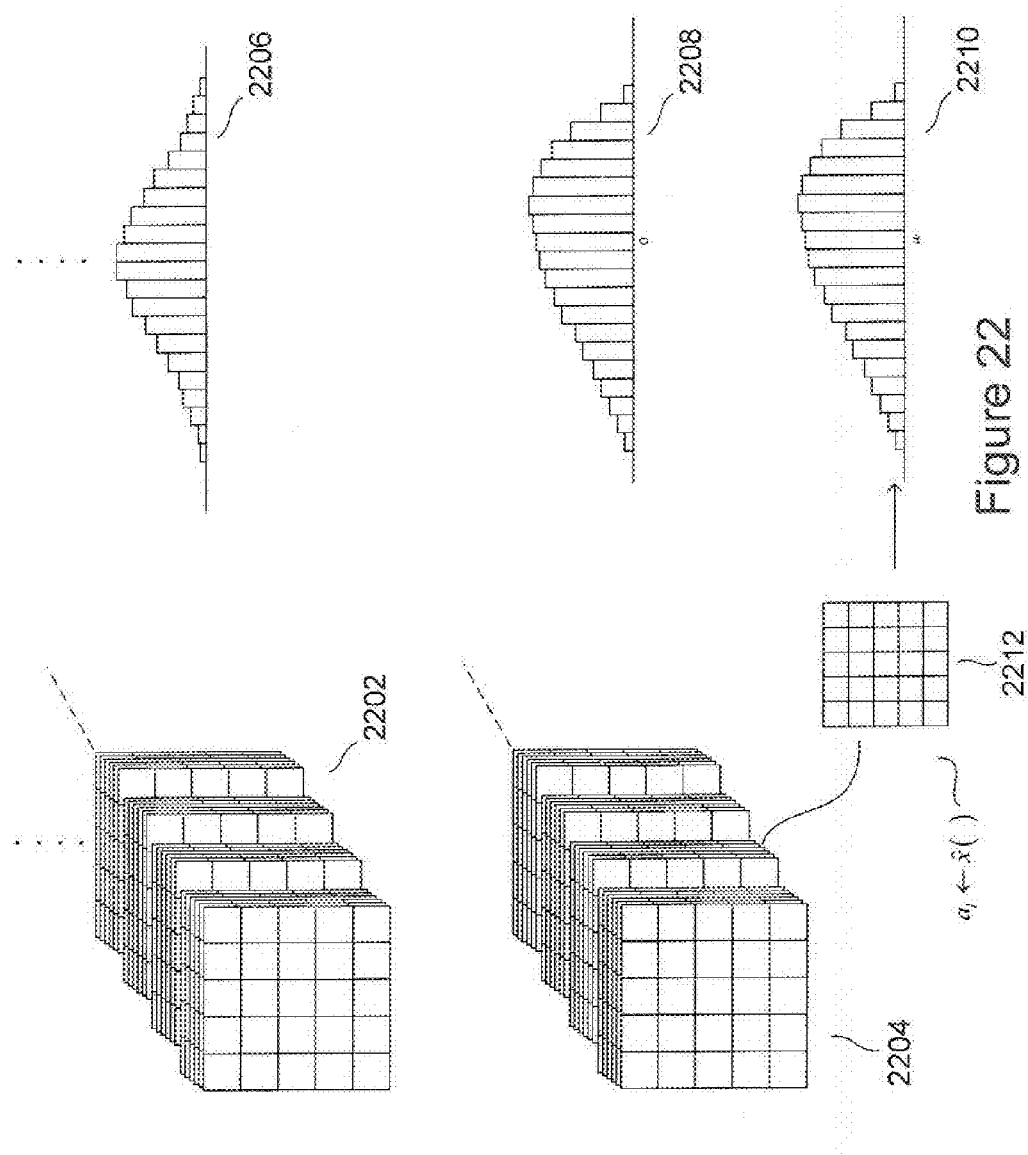

In order to achieve meaningful levels of observables, contexts are grouped into various types of context classes, including prediction classes and conditioning classes. FIGS. 20-22 illustrate the concept of prediction classes and conditioning classes. As shown in FIG. 20, each different context that occurs in an image, such as context 2002, would be expected to generate a corresponding symbol-occurrence distribution, such as symbol-occurrence distribution 2004, were the context to occur a sufficient number of times in the image. However, as one example, for a grayscale image, in which each pixel value is selected from the range {0, 1, . . . , 255}, the number of possible 5×5 contexts, each of which includes the 24 symbols other than the central symbol, is $256^{24}$. Were these different possible contexts to be of equal probability of occurrence within an image, the probability that any given context would occur even a single time within the image would be vanishingly small. Even for decidedly non-uniform context-occurrence probability distributions, there are nonetheless generally far too few occurrences of most contexts to generate statistically meaningful symbol-occurrence distributions, such as those shown in FIG. 20, for individual contexts.

FIG. 21 illustrates prediction classes into which individual contexts are grouped, in FIG. 21, four prediction classes 2102-2105 are shown associated with four corresponding prediction-error distribution 2108-2111. All of the contexts within a prediction class are assumed to exhibit similar prediction-error distributions. Various different techniques may be used to group contexts together into prediction classes. In general, the context groupings are estimates derived from numerical procedures based on assumptions of the distribution of pixel values in images. For example, for particular types of images, assumption of continuity of pixel-value trends along arbitrary directions within the image may be assumed. Additional assumptions may include symmetry-based assumptions and/or pixel-values-sealing based assumptions. A first prediction traversal of the image is used to accumulate distributions of prediction errors for each prediction class. A symbol $\tilde{x}_i$ is predicted for each prefiltered-image symbol $y_i$ using a prediction function $\tilde{x}(S_i^{y_i})$, where $S_i^{y_i}$ is the prefiltered-image context in which prefiltered-image symbol $y_i$ is embedded. A prediction error, $y_i - \tilde{x}(S_i^{y_i})$, is then computed for each predicted symbol $\tilde{x}_i$. Although it would be possible to accumulate the errors in a histogram for each prediction class, as shown in FIG. 21, the errors are more efficiently accumulated as a running average error. By computing prediction errors from prefiltered-image symbols, rather than from noisy-image symbols $z_i$, as in the above-described DUDE and DUDE-CTI methods, a significant amount of noise distortion in contexts and in prediction-error statistics is avoided. Accumulation of prediction errors for all of the contexts in a prediction class is possible because, although each context in a prediction class may predict a different symbol, the predicted error $y_i - \tilde{x}(S_i^{y_i})$ depends only on the 0-centered prediction-error distribution common to all contexts within the prediction class. However, despite an assumption that the prediction-error distributions are centered about 0, it is often observed, as shown in FIG. 21, that the observed prediction-error distributions are slightly shifted, or biased, with a non-zero mean prediction error. For example, the prediction-error distribution 2108 exhibits a bias 2014 of 1, since the mean prediction error is 1.

The estimated biases obtained from the prediction-error distributions accumulated for each prediction class, in the first traversal of the image, are used to correct the symbols predicted from each prediction class so that the prediction-error distribution for each prediction class has a mean value of 0. Once corrected, following the first traversal of the image, the prediction classes are grouped together into larger conditioning classes for conditioning-class statistics collection in a second traversal of the image. FIG. 22 illustrates conditioning classes. In FIG. 22, two conditioning classes 2202 and 2204 are shown with, associated prediction-error distributions 2206 and 2208. In general, a sufficient number of contexts are grouped within each conditioning class to obtain a common, statistically meaningful prediction-error distribution for each conditioning class. As shown in FIG. 22, the symbol-occurrence probability distribution 2210 for a particular context C 2212 of a conditioning class can be obtained by centering the conditioning-class prediction-error distribution about the symbol predicted from the context C by the prediction function $\tilde{x}(C)$ and normalizing the distribution.

Figure 23:
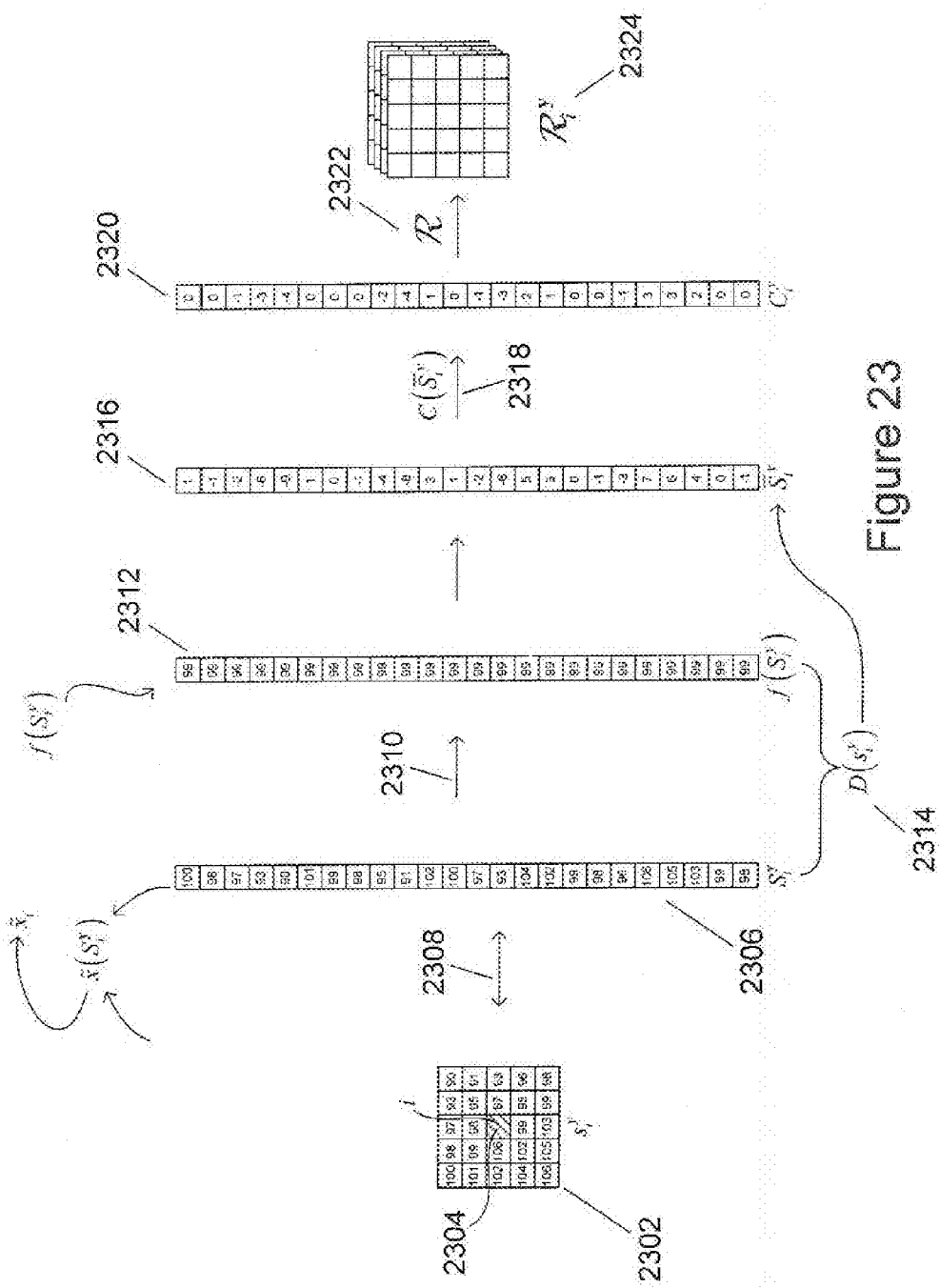
FIG. 23 illustrates a number of context-related transformations that are carried out during statistics-collection phases of methods that represent embodiments of the present invention.

FIG. 23 illustrates a number of context-related transformations that are carried out during statistics-collection phases of methods that represent embodiments of the present invention. First, consider a particular context 2302 that represents the neighborhood about a particular context-embedded symbol $y_i$ within the prefiltered image y. A notation for this context, used in the subsequent discussion, is $S_i^y$. In FIG. 23, exemplary pixel values are shown for the elements of the context 2302, with crosshatching 2304 indicating that the pixel, or symbol, $y_i$ is not considered to be an element of the context, but is instead the prefiltered-image symbol embedded within the context. A context $S_i^y$ can be thought of as a two-dimensional context 2302 or, equivalently, as a one-dimensional vector 2306. The two-dimensional context to one-dimensional vector transition 2308 is essentially carried out, in the example shown in FIG. 23, by concatenating rows of the two-dimensional context in a particular order. Either representation of the context can be used, as an argument, for the function $\tilde{x}(\ )$ that generates a predicted value $\tilde{x}$ for the prefiltered-image symbol $y_i$ embedded in the context:

$$\tilde{x}_i = \tilde{x}(S_i^y).$$

A variety of different value-prediction functions, based on the values of elements of the context, can be used in various embodiments of the present invention. As one example, the value-prediction function may be simply a computation of an average symbol value or weighted-average symbol value based on the symbol values in the context, with context elements closer, as determined by an appropriate distance metric, to the embedded symbol weighted more heavily than context elements further away from the embedded symbol. More complex value-prediction functions may additionally consider the presence of symbol-value gradients within the context, and consider additional features or characteristics of the context.

In a next transition 2310, the context $S_i^y$ is input to a function $f(\ )$ to produce a derived vector $f(S_i^y)$ 2312 which is subtracted from context $S_i^y$ 2306 in a difference operation $D(S_i^y)$ 2314 to produce a differential representation of the context $\overline{S}_i^y$ 2316. In the example shown in FIG. 23, the function $f(S_i^y)$ creates a vector, with dimension equal to that of $S_i^y$, with each element, or component, having the value $\tilde{x}_i$. In alternative embodiments of the present invention, the function $f(S_i^y)$ may produce a vector containing one or values derived from $\tilde{x}_i$. In a next transformation 2318, the differential representation of the context $\overline{S}_i^y$ is converted, to a canonical representation $C_i^y$ 2320 by the function $C(\ )$. Various different functions may be used to generate the canonical representation, including rounding of the entries and rotation or permutation of the entries based on magnitudes. In one family of embodiments of the present invention, the function $C(\ )$ rounds real-valued elements of the differential representation of the context $\overline{S}_i^y$ to closest integer values. In an example shown in FIG. 23, the function $C(\ )$ applies integer division by 2 to the elements of the differential representation of the context $\overline{S}_i^y$ to generate the canonical representation $C_i^y$ 2318. Finally, the function $\mathcal{R}$ 2322 is used to determine the prediction class $\mathcal{R}_i^y$ 2324 that corresponds to the canonical representation of the context $C_i^y$ 2320.

Figure 24:
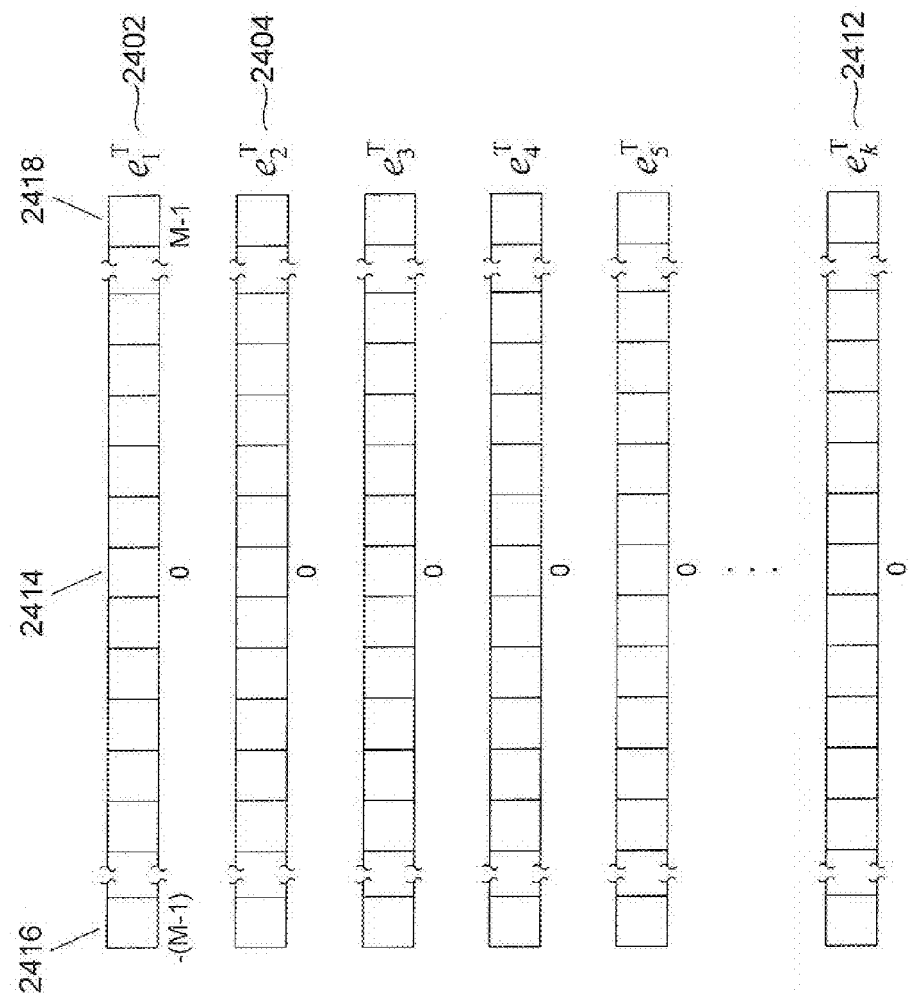
FIG. 24 shows a data structure employed in the statistics-collection phases of methods of the present invention.

FIG. 24 shows a data structure employed in the statistics-collection phases of methods of the present invention. For each conditioning class $Q_k$, method embodiments of the present invention maintain a prediction-error-statistics vector $e_k$. Thus, as shown in FIG. 24, method embodiments of the present invention maintain the prediction-error-statistics vectors $e_1$ 2402, $e_2$ 2404, . . . , $e_k$ 2412 for collecting prediction-error statistics for each conditioning class. Each prediction-error-statistics vector has 2M−1 elements, with the center element, such as center element 2414 in prediction-error-statistics vector 2402, indexed as the $0^{th}$ element and the two terminal elements, 2416 and 2418 for prediction-error-statistics vector 2402, indexed as −(M−1) and M−1, respectively. The prediction-error-statistics vectors $e_k$ are dimensioned so that a closest integer value corresponding to each possible prediction error $z_i$−$\tilde{x}_i$ is associated with aft element in the prediction-error-statistics vector.

In previous discrete universal denoisers, an image is traversed, context-by-context, to compute and accumulate prediction errors $z_i$−$\tilde{x}_i$ for each conditioning class. The prediction errors are accumulated in a conditioning-class-specific accumulation vector, as discussed above with respect to FIG. 18, for each conditioning class. Accumulation comprises incrementing a vector element indexed by the prediction error in a conditioning-class-specific accumulation vector, or, in other words, adding a vector with a single element indexed by the prediction error having the value "1" and all other elements having the value "0" to the conditioning-class-specific accumulation vector. After prediction-error accumulation is complete, the conditioning-class-specific accumulation vectors are transformed to generate estimated clean-symbol-occurrence distributions for the corresponding conditioning classes, a process referred to as "channel inversion" or as "inversion." Unfortunately, as discussed above with reference to FIG. 18, prediction errors resulting from certain types of noise, including salt-and-pepper noise, are not properly aligned in prediction-error accumulation, resulting in noise-corrupted prediction-error statistics which, upon inversion, may generate poor estimates for clean-symbol-occurrence distributions.

Figure 25:
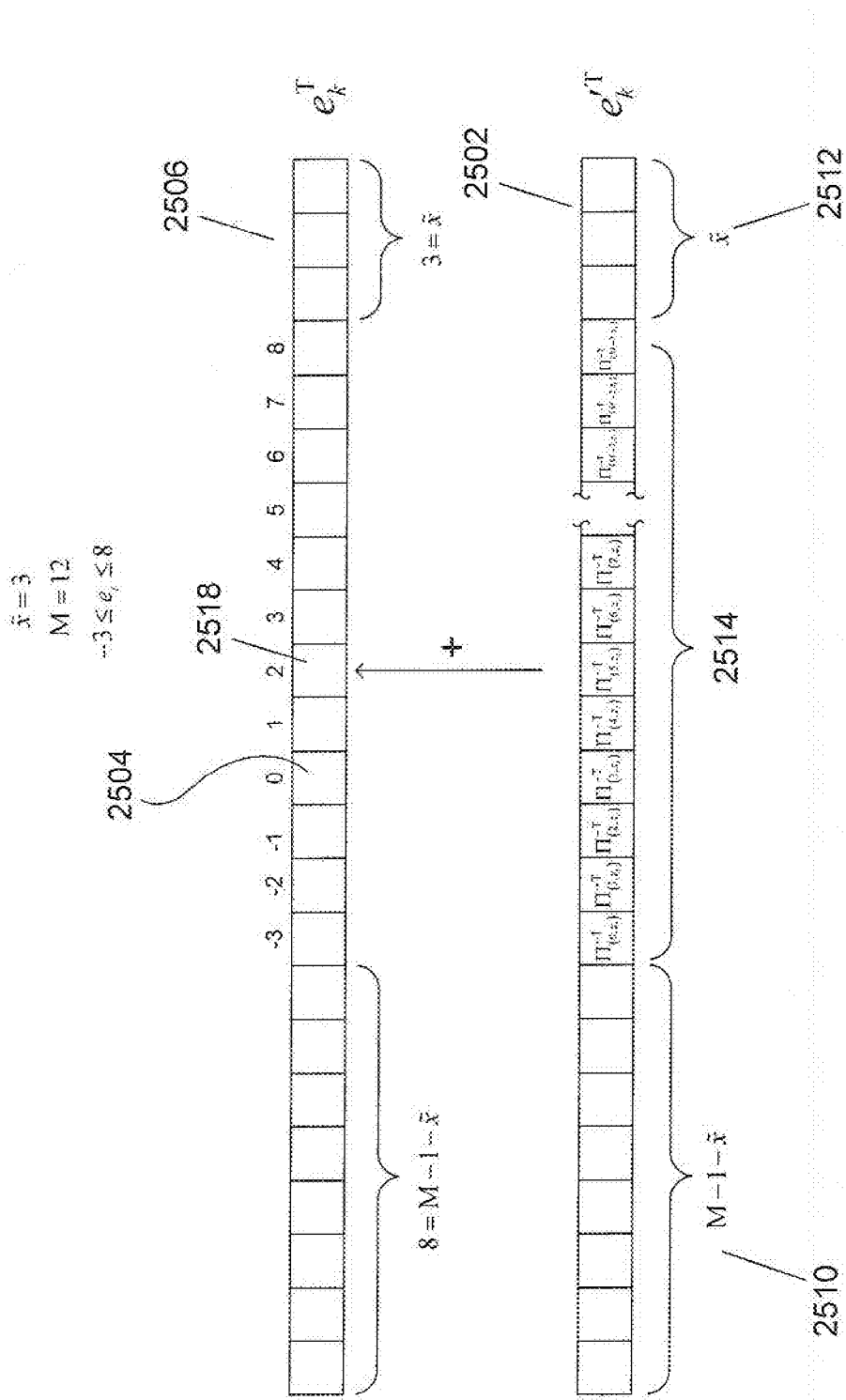
FIG. 25 illustrates an update step in prediction-error accumulation during a statistics-collection phase of embodiments of the present invention.

FIG. 25 illustrates an update step in prediction-error accumulation during a statistics-collection phase of embodiments of the present invention. In FIG. 25, a next prediction error, collected during analysis of the image and represented by prediction-error vector $e'_k$ 2502, is added to the prediction-error-statistics vector $e_k$ in order to update prediction-error-statistics vector $e_k$ for conditioning class $Q_k$. Although each $e_k$ prediction-error-statistics vector has 2M−1 elements, since the prediction function $\tilde{x}(\ )$ predicts a value $\tilde{x}_i$ for a particular context $S_i^y$, the possible prediction errors for a particular context range from $a_0$−$\tilde{x}_i$, to $a_{M-1}$−$\tilde{x}_i$, a total of M possible values, where the noisy, prefiltered, predicted, and clean image pixels are assumed take values in the set $a_0$ . . . $a_{M-1}$, below, for simplicity, considered specifically to be the integers 0 . . . M−1 (that is $a_i$=i). Different contexts, even different contexts within a particular conditioning class, may generate different predicted values $\tilde{x}$ when furnished as arguments to the function $\tilde{x}(\ )$. Therefore, the range of possible prediction errors may differ for different contexts within a context class. As noted above, the prediction error 0, when $\tilde{x}_i$=$z_i$, is accumulated in the central element 2504 of the prediction-error-statistics vector 2506. In order to provide a simple mechanism for prediction-error-statistics vectors to be updated, during statistics collection, the prediction-error vector $e'_k$ is constructed by including a first run of zeros, or a first offset, of length M−1−$\tilde{x}$ 2510 at the left end of the prediction-error vector $e'_k$ and a set of zero elements, of length $\tilde{x}$, at the right end 2512 of the prediction-error vector $e'_k$. Between these two offsets, or padding regions, the remaining M elements 214 contain values related to the channel-noise-model matrix $\pi$. These values are, by construction, placed into elements of the prediction-error vector $e'_k$ that align with the possible prediction errors. The values are essentially a column of the matrix $(\pi^T)^{-1}$. In essence, these values represent an inversion of a particular noisy-image symbol value to a probability distribution of corresponding estimated-dean-image symbols. Embodiments of the present invention therefore apply inversion into an estimated-clean-image symbol probability distribution during statistics collection, on a symbol-by-symbol basis, rather than first accumulating the noisy-image statistics and then estimating corresponding clean-image-symbol distributions by multiplication by $\pi^{-1}$. A benefit of the approach of the present invention is that, when inversion is applied to prediction-error vectors, rather than to accumulated statistics for a conditioning class, the correct inversion is applied to salt-and-pepper peaks. For example, in the example shown in FIG. 25, $\tilde{x}_i$=3, M=12, and, therefore, the possible prediction error values fall in the range −3≤$e_i$≤8. Note that prediction errors are rounded to integer values. Prediction errors −3 and 8 correspond to prediction errors expected for salt and pepper noise. Addition of the prediction-error vector $e'_k$, constructed as described above, adds the appropriate channel-noise-model-derived probabilities, $(\pi^T)_{(0,z_i)}^{-1}$, and $(\pi^T)_{(M-1,z_i)}^{-1}$, respectively, to the prediction errors associated with salt-and-pepper noise. Were inversion carried out after accumulation of statistics, the salt-and-pepper-related peaks would be distributed across the tails of the prediction-error distributions, as discussed above with reference to FIG. 18, and thus, inversion results in incorrect channel-noise-model-derived factors applied to most salt-and-pepper-related peaks. Inversion during statistics collection thus significantly ameliorates distortions introduced info the estimated clean-image-symbol distributions due to inversion, following statistics accumulation, of noise-corrupted prediction-error statistics.

Figure 26:
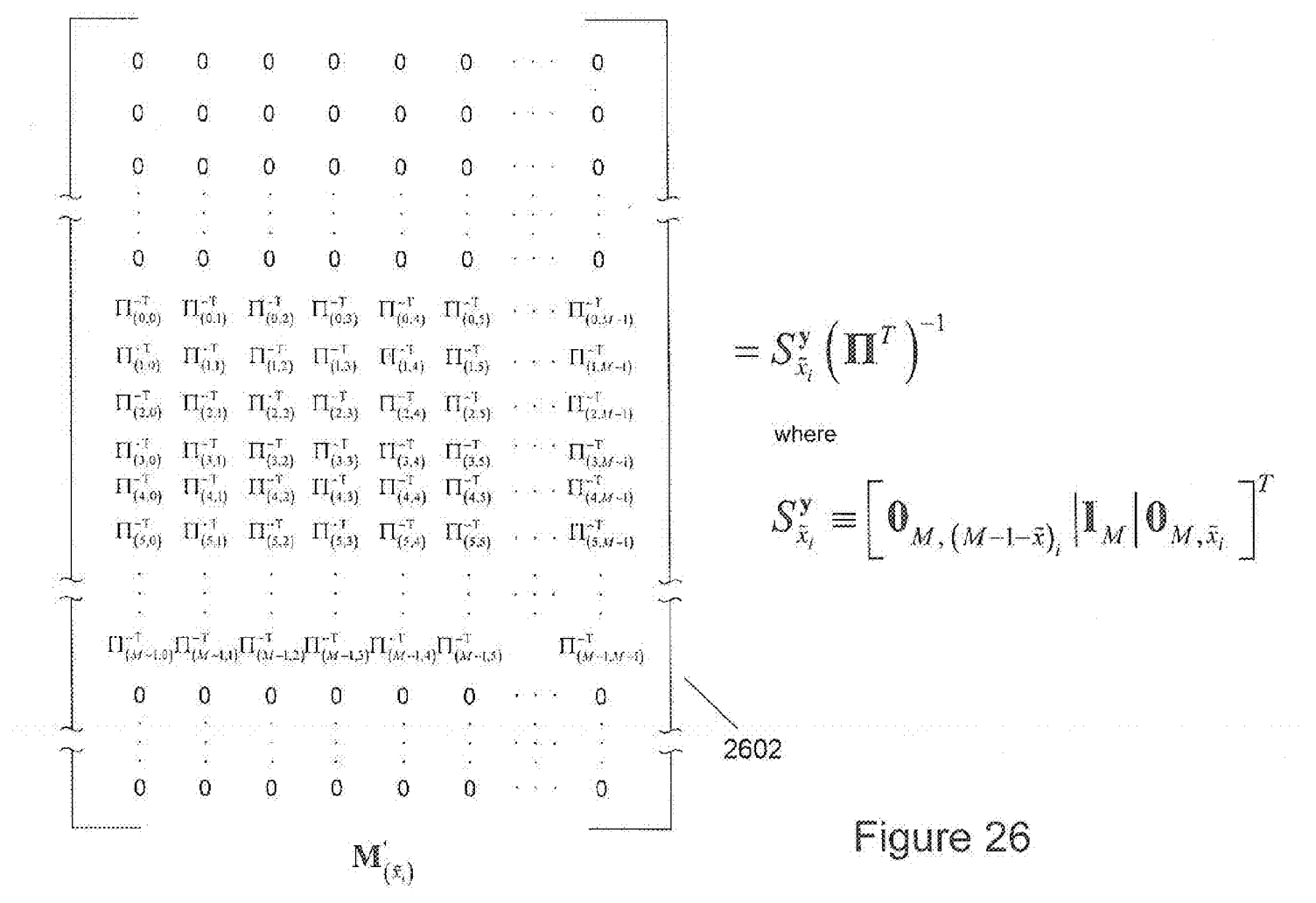
Figure 27:
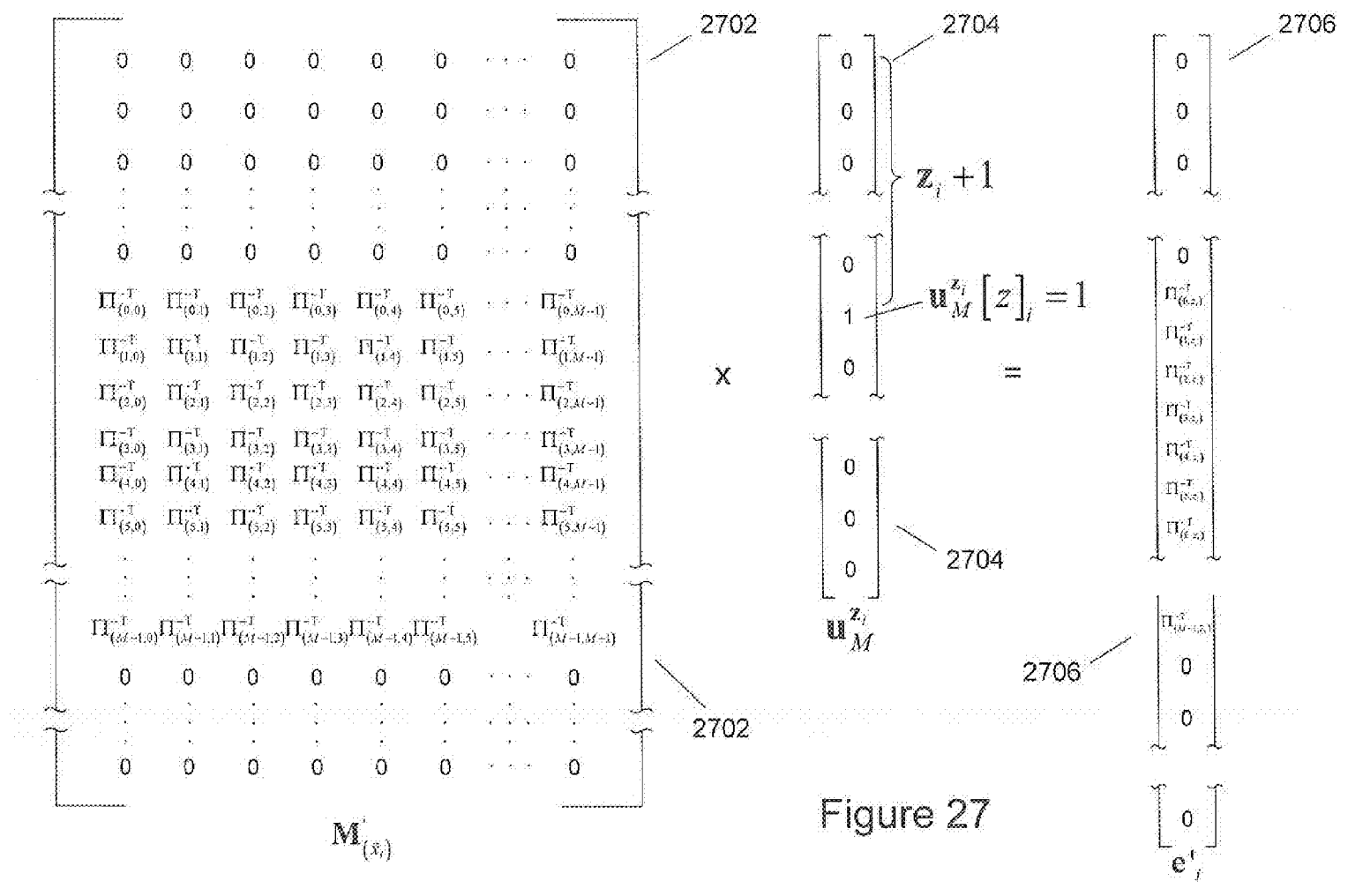

FIGS. 26 and 27 illustrate construction of the prediction-error vector for a particular context used in an update step in prediction-error accumulation during a statistics-collection phase of embodiments of the present invention. As shown in FIG. 26, the matrix $M'_{(\tilde{x}_i)}$ 2602 is constructed as a (2M−1)×M matrix, with the first $M-1-\tilde{x}$ rows and the final $\tilde{x}$ rows having only zero-valued elements, and the interior M rows 2604 comprising the inverted transpose of channel-noise-model matrix $\pi$, $(\pi^T)^{-1}$. As discussed above, in the preceding section, it is the inverse of $\pi$, or a suitable pseudo-inverse of $\pi$, that is used to compute clean-symbol counts from noisy-symbol counts:

$$\tilde{q}_{clean,C_i}^T \cong \tilde{q}_{C_i}^T \pi^{-1}$$

in the DUDE-CTI method. The matrix $\pi^{-1}$ plays a similar roil in computing estimate clean-image prediction-error probability distributions. Algebraically, the construction of matrix $M_{(\tilde{x}_i)}^1$ can be expressed as:

$$M'_{(\tilde{x}_i)} = S_{\tilde{x}_i}^y (\pi^T)^{-1}$$

where $$S_{\tilde{x}_i}^y = [0_{M,M-1-\tilde{x}_i} | I_M | 0_{M,\tilde{x}_i}]^T.$$

Having constructed matrix $M'_{(\tilde{x}_i)}$, a vector $u_M^{z_i}$ is constructed, as shown in FIG. 27, by placing the value "1" in the element of $u_M^{z_i}$ corresponding to the value $z_i$ and placing the value "0" in all other elements of vector $u_M^{z_i}$. As shown in FIG. 27, multiplication of $M'_{(\tilde{x}_i)}$ (2702 in FIG. 27) by vector $u_M^{z_i}$ (2704 in FIG. 27) produces the prediction-error vector $e'_k$ (2706 in FIG. 27), discussed above with reference to FIG. 25.

In fact, to more efficiently collect prediction-error statistics, the vectors $u_M^{z_i}$ generated for each predicted symbol value $\tilde{x}$ can be accumulated in accumulation vectors $e_{k,\tilde{x}}$, during traversal of the image, and, for each conditioning class k, the accumulation vector $e_{k,\tilde{x}}$ for each predicted symbol value $\tilde{x}$ can be multiplied by $M'_{(\tilde{x}_i)}$ and then added to the prediction-error vector $e_k$ to generate a final prediction-error vectors $e_k$ identical to that produced by the above-described embodiment of the present invention. Thus, multiplication by matrices $M'_{(\tilde{x}_i)}$ for predicted symbols $\tilde{x}$ is carried out only once, per predicted symbol, as a last step of statistics collection, for each conditioning class.

Figure 28:
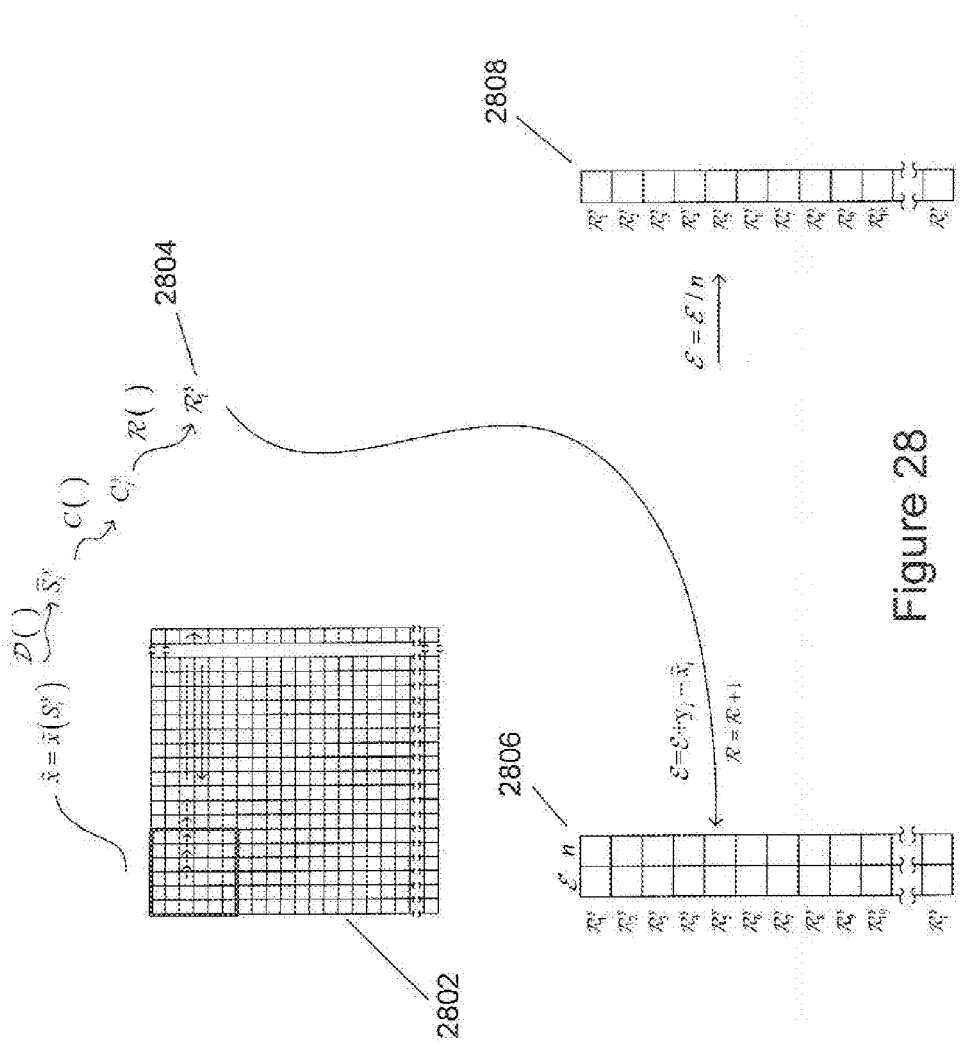
FIG. 28 illustrates a first phase of statistics collection carried out by embodiments of the present invention.

FIG. 28 illustrates a first phase of statistics collection carried out by embodiments of the present invention. As shown in FIG. 28, the prefiltered image y 2802 is analyzed by considering the context $S_i^y$ for each symbol $y_i$ in the image. A series of transformations discussed above with reference to FIG. 23 are carried out to compute the prediction class $\mathcal{R}_i^y$ for symbol $y_i$ 2804 within context $S_i^y$, and to use the prediction class as an index for an entry in table 2806 of $\epsilon$ and n values for each prediction class. A table entry is updated for each context $S_i^y$. The update operation updates a cumulative prediction-error value $\epsilon$ and a number n representing the number of occurrences of contexts belonging to the prediction class in the prefiltered image y. In other words, for a prediction class $\mathcal{R}_i^y$ observed in prefiltered image y, the update operation can be described as:

$$\epsilon(\mathcal{R}_i^y) = \epsilon(\mathcal{R}_i^y) + y_i - \tilde{x}_i$$

$$n(\mathcal{R}_i^y) = n(\mathcal{R}_i^y) + 1$$

Once the entire prefiltered image y has been analyzed, a final prediction-error bias $\epsilon$ is computed for each prediction class $\mathcal{R}_i^y$ as:

$$\epsilon(\mathcal{R}_i^y) = \epsilon(\mathcal{R}_i^y)/n(\mathcal{R}_i^y)$$

The final, computed bias values $\epsilon(\mathcal{R}_i^y)$ are stored in a table of bias values 2808, from which a bias value $\epsilon(\mathcal{R}_i^y)$ for prediction class is retrieved by an indexing operation.

Figure 29:
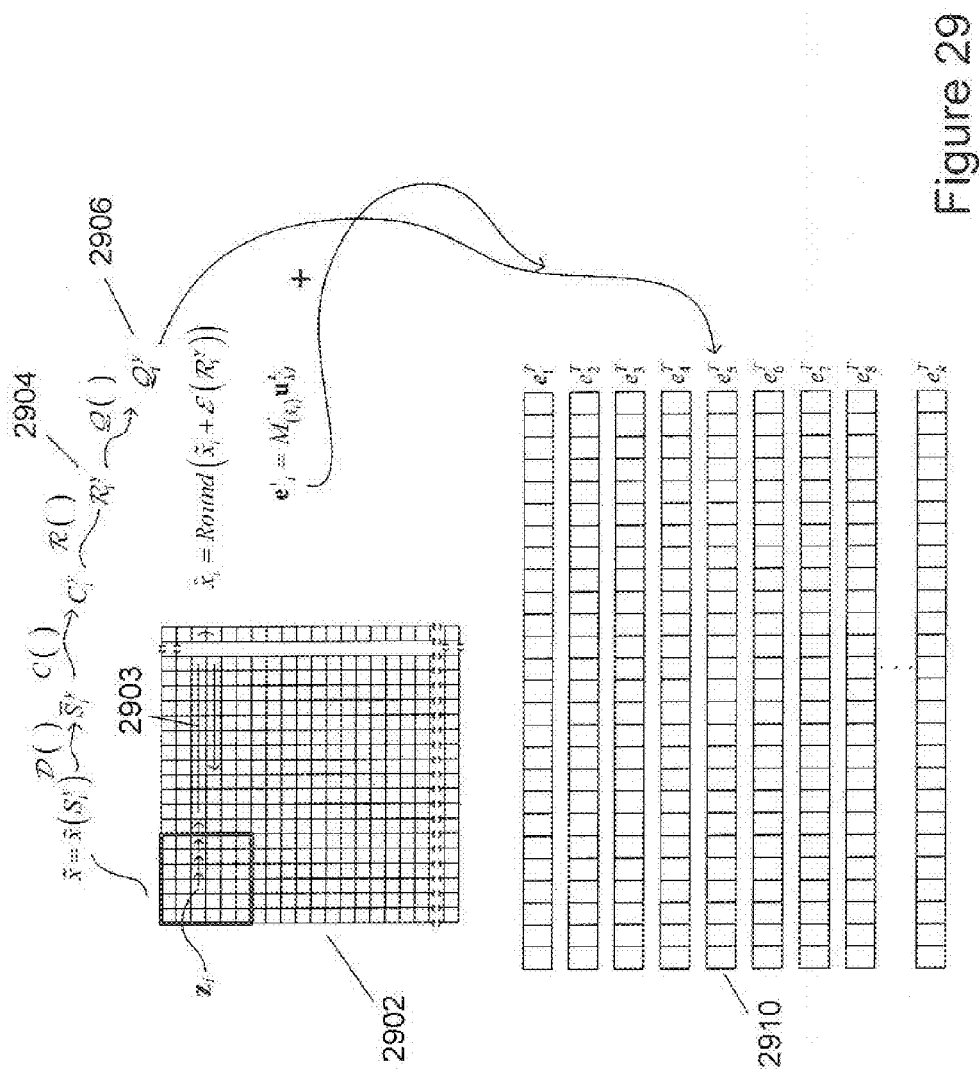
FIG. 29 illustrates a second phase of statistics collection carried out by method embodiments of the present invention.

FIG. 29 illustrates a second phase of statistics collection carried out by method embodiments of the present invention. This phase also involves a traversal of the image, context-by-context, as indicated by the context superimposed over image y 2902 in FIG. 29, with an initial portion of the traversal path shown as arrow 2903. For each context, the transformations as discussed with reference to FIG. 23 are carried out to compute the prediction class 2904 for the context, and the function Q( ) is applied to the prediction class to compute the conditioning class $Q_i^y$ 2906 for the context. The prediction-error-statistics vector for the conditioning class, prediction-error-statistics vector 2910 in the example shown in FIG. 29, is updated by the prediction-error vector $e'_i$ computed, as discussed above with reference to FIGS. 25-27, as:

$$e'_i = M'_{(\tilde{x}_i)} \mu_M^{z_i}$$

where the normalized predicted symbol $\tilde{x}$ is computed as:

$$\hat{x}_i = \text{Round}(\tilde{x}_i + \epsilon(R_1^y))$$

Thus, the second phase of statistics collection accumulates prediction-error distributions in the prediction-error-statistics vectors $e_1, e_2, \ldots, e_k$. Again, as discussed above, the vectors $u_M^{z_i}$ generated for each predicted symbol value $\hat{x}$ can be accumulated for each conditioning class, and multiplication by matrices $M'_{(\tilde{x}_i)}$ for predicted symbols $\hat{x}$ carried out only once, as a last step of statistics collection, for each conditioning class.

FIG. 30 illustrates a matrix $C(\tilde{x})$ that is used during normalization of prediction-error-statistics vectors according to embodiments of the present invention. The matrix $C(\tilde{x})$ is an M×(2M−1) matrix which, like the matrix $M'_{(\tilde{x}_i)}$, has three sections. A first section 3004 of M−1−$\tilde{x}$ columns includes an initial row of "1"-valued elements 3006 and all remaining M−1 rows having only "0"-valued elements. A final section 3008 has a final row of "1"-valued elements 3010 and all remaining M−1 rows having only "0"-valued elements. An interior submatrix of dimension M×M is a diagonal matrix with diagonal elements having the value "1" 3012.

Figure 31A:
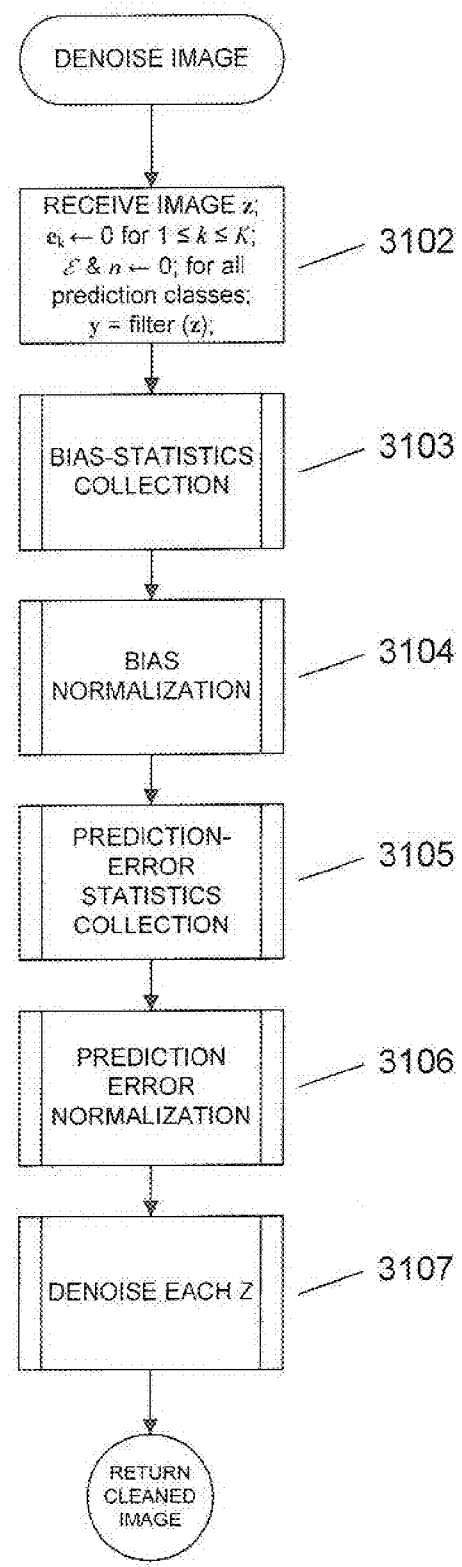
FIGS. 31A-H provide control-flow diagrams that illustrate one embodiment of the present invention.

FIGS. 31A-H provide control-flow diagrams that illustrate one embodiment of the present invention. FIG. 31A illustrates, at highest level, an image-denoising embodiment of the present invention. In step 3102, noisy image z is received. The prediction-error-statistics vectors $e_k$, where $1 \leq k \leq K$, described above with reference to FIG. 24, are initialized to contain all "0" values, and the table of $\epsilon$ and n values (2806 in FIG. 28) for the prediction classes is also initialized to contain all "0" values. A prefiltered image y is generated from noisy image z by a prefiltering operation. Thus, in step 3102, the "bias-statistics collection" data structures are initialized and the prefiltered image y is generated by one of numerous possible filtering operations carried out on noisy image z.

In step 3103, bias statistics are collected, as discussed with reference to FIG. 28, above, in the table (2806 in FIG. 28) containing ϵ and n values for each prediction class. In step 3104, the routine "bias normalization" is called in order to compute the final bias ϵ for each prediction class stored in table 2808 in FIG. 28. In step 3105, the routine "prediction-error statistics collection" is called to accumulate prediction errors in the prediction-error-statistics vectors $e_1$ through $e_K$, as discussed above with reference to FIG. 29. In step 3106, the prediction-error-statistics vectors are normalized. Finally, in step 3107, each symbol $z_i$ in the noisy image z is denoised using the normalized prediction-error-statistics vectors.

Figure 31B:
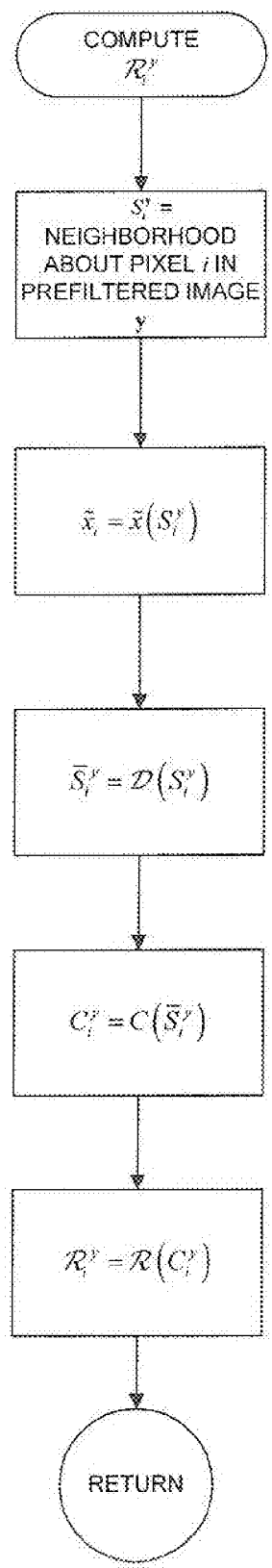

FIG. 31B provides a control-flow diagram for the subroutine "compute $\mathcal{R}_i^y$." This subroutine carries out the transformations discussed above with reference to FIG. 23. In step 3109, the context $S_i^y$ for a prefiltered-image pixel $y_i$ is determined. In step 3110, a value $\tilde{x}_i$ is predicted from the context $S_i^y$ by application of the prediction function $\tilde{x}()$. In step 3111, the differential representation of the context $\overline{S}_i^y$ is computed by application of the difference function $D()$. In step 3112, the canonical representation of the context $C_i^y$ is computed from the differential representation of the context $\overline{S}_i^y$. Finally, the prediction class $\mathcal{R}_i^y$ for the context is computed by application of the function $\mathcal{R}()$ to the canonical representation of the context $C_i^y$ in step 3113.

Figure 31C:
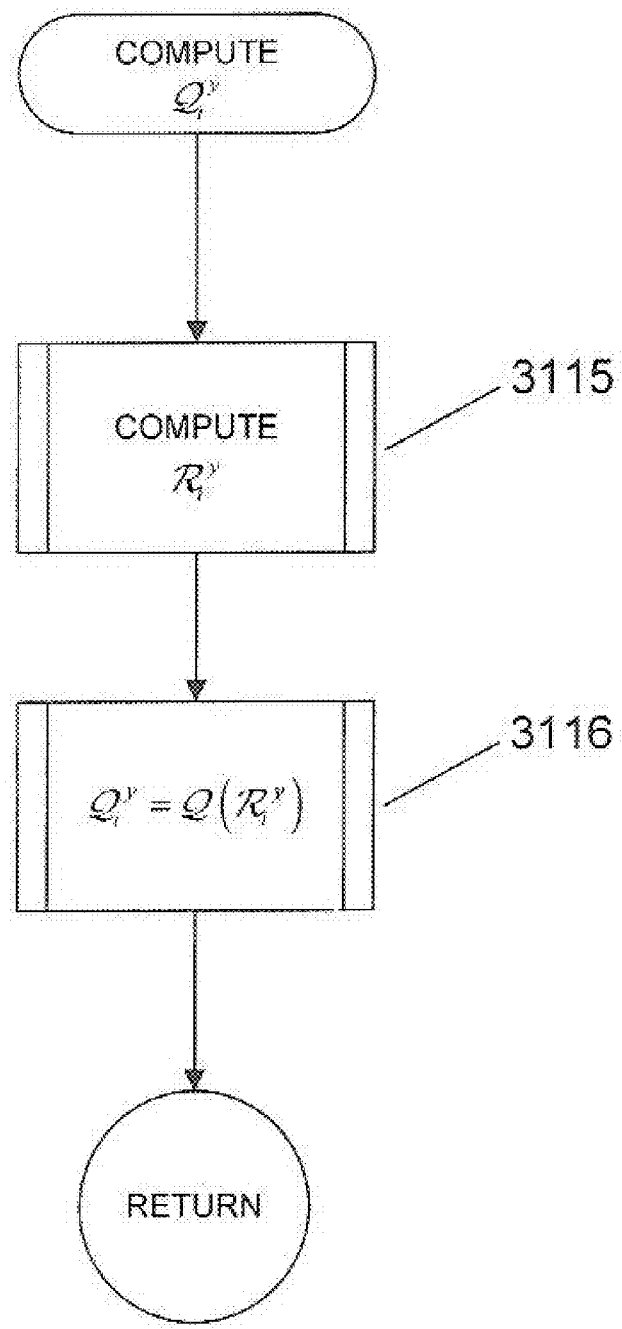

FIG. 31C provides a control-flow diagram for the subroutine "compute $Q_i^y$." In this routine, the subroutine "compute $\mathcal{R}_i^y$" is called in step 3115, followed by a computation of the conditioning class $Q_i^y$ for a prefiltered-image element $y_i$ by application of the function $Q()$ to the prediction class $\mathcal{R}_i^y$ in step 3116. The routine compute $Q_i^y$ implicitly computes the index k of the conditioning class.

Figure 31D:
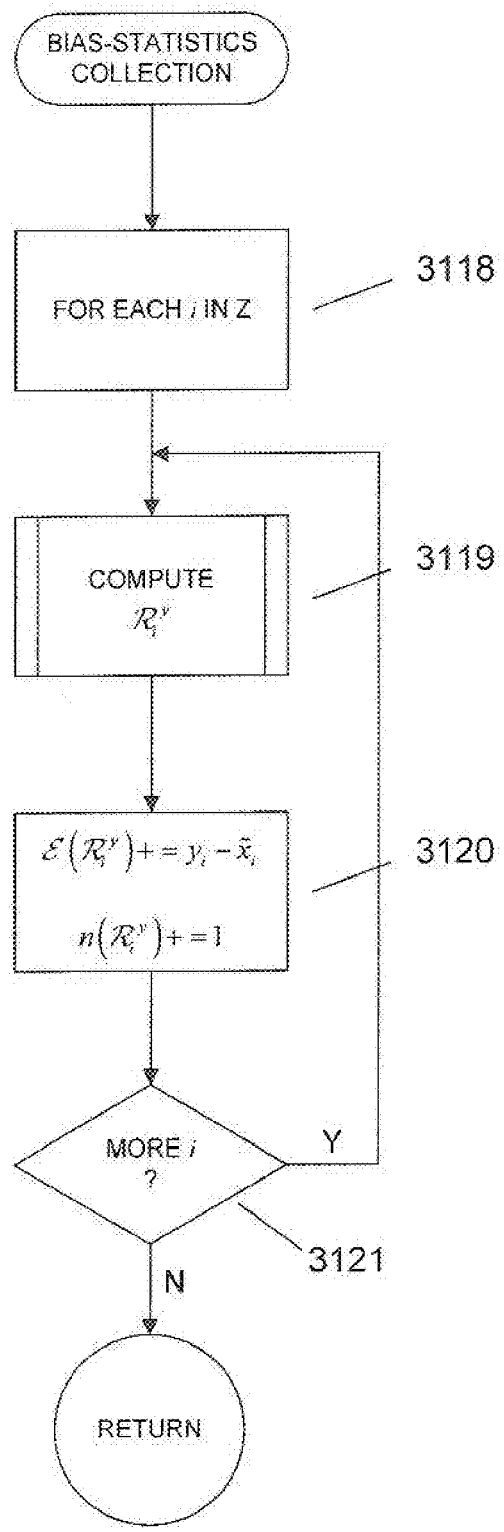

FIG. 31D provides a control-flow diagram for the routine "bias-statistics collection." This routine is called in step 3103 of FIG. 31A. In the for-loop of steps 3118-3121, the noisy image z is traversed, pixel by pixel. For each pixel $z_i$, corresponding prediction class is computed via a call to the subroutine "compute $\mathcal{R}_i^y$" in step 3119. Then, the table entry of table 2806 in FIG. 28 for the prediction class is updated as discussed above with reference to FIG. 28.

Figure 31E:
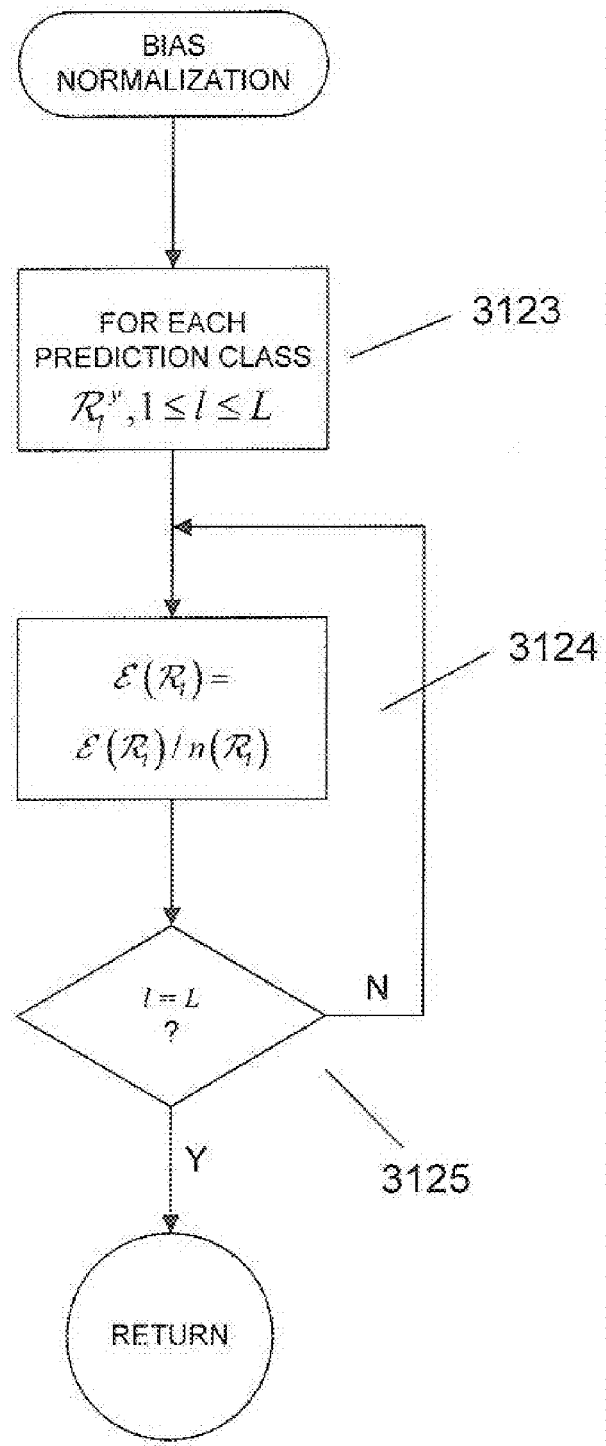

FIG. 31E provides a control-flow diagram for the routine "bias normalization," called in step 3104 of FIG. 31A. In the for-loop of steps 3123-3125, the bias value $\epsilon(\mathcal{R}_l)$ for each prediction class $\mathcal{R}_l$ is computed as $\epsilon(\mathcal{R}_l)/n\epsilon(\mathcal{R}_l)$, as discussed above with reference to FIG. 28.

Figure 31F:
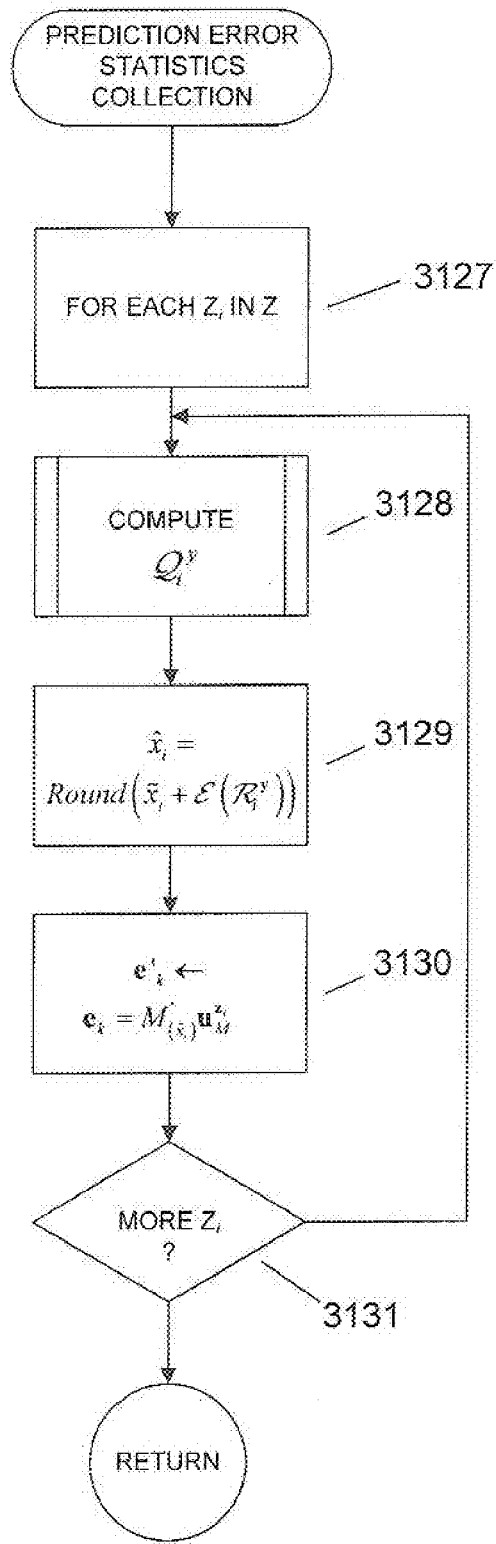

FIG. 31F provides a control-flow diagram for the routine "prediction error statistics collection" called in step 3105 of FIG. 31A. In the for-loop of steps 3127-3131, each pixel $z_i$ in noisy image z is again considered. In step 3128, the subroutine "compute $Q_i^y$" is called to compute the conditioning class for the currently considered pixel, and, implicitly, the index of the conditioning class k. In step 3129, the normalized predicted symbol $\hat{x}_i$ is computed, as discussed above with reference to FIG. 29, as:

$$\hat{x}_i = \text{Round}(\tilde{x}_i + \epsilon(\mathcal{R}_i^y))$$

In step 3130, a prediction-error vector is computed for conditioning class $Q_i^y$ and added to the prediction-error-statistics vector for conditioning class $Q_i^y$, as discussed above with reference to FIGS. 24-27. Following statistics collection, the prediction-error-statistics vectors $e_k$ are estimates, for each context class k, of the probability distributions $\hat{P}_E(Q_k)$ of the symbol prediction error $x_i - \hat{x}_i$, where $x_i$ is the clean-image symbol value, that is generally unobservable, and $\hat{x}_i$ is the normalized predicted symbol obtained by adding the prediction-class bias to clean-symbol-predicted-value $\tilde{x}_i$.

Figure 31G:
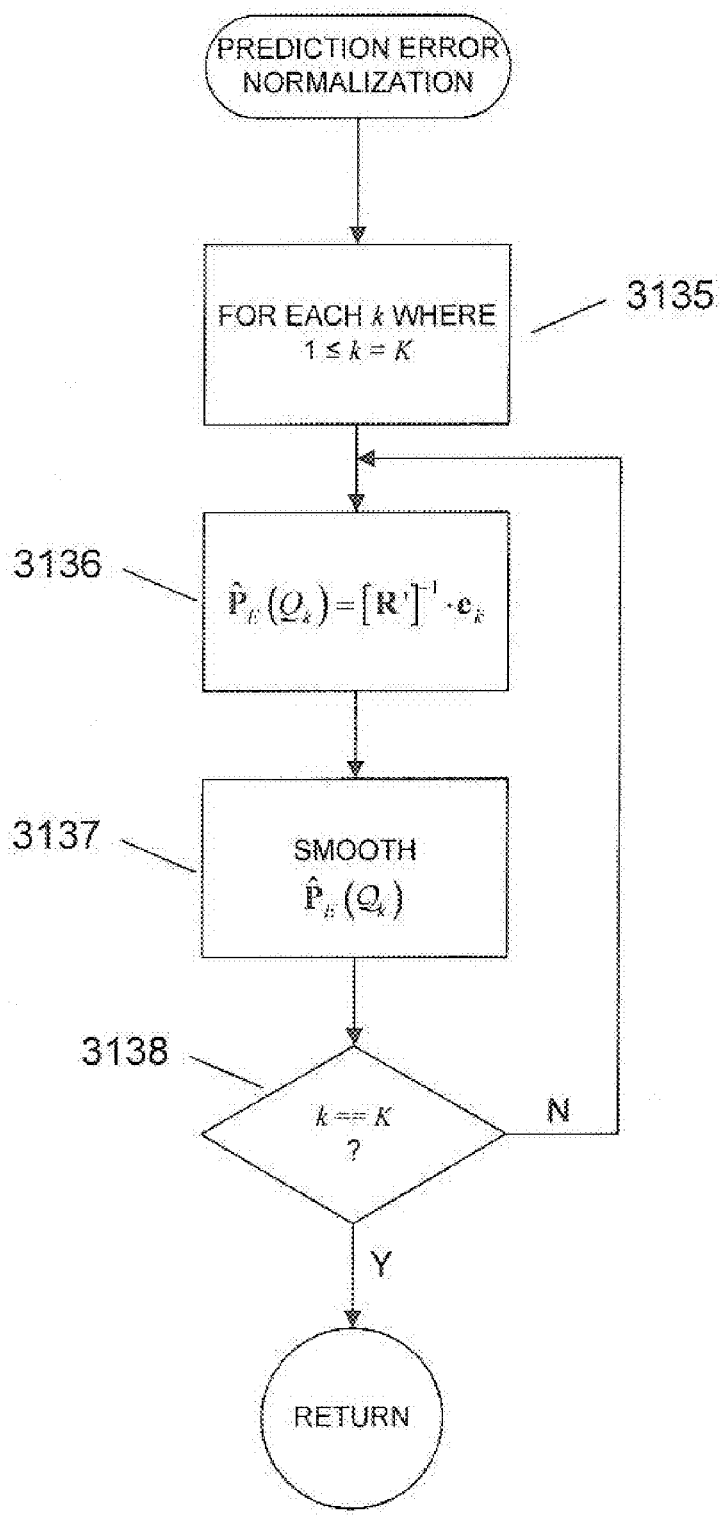
Figure 31:
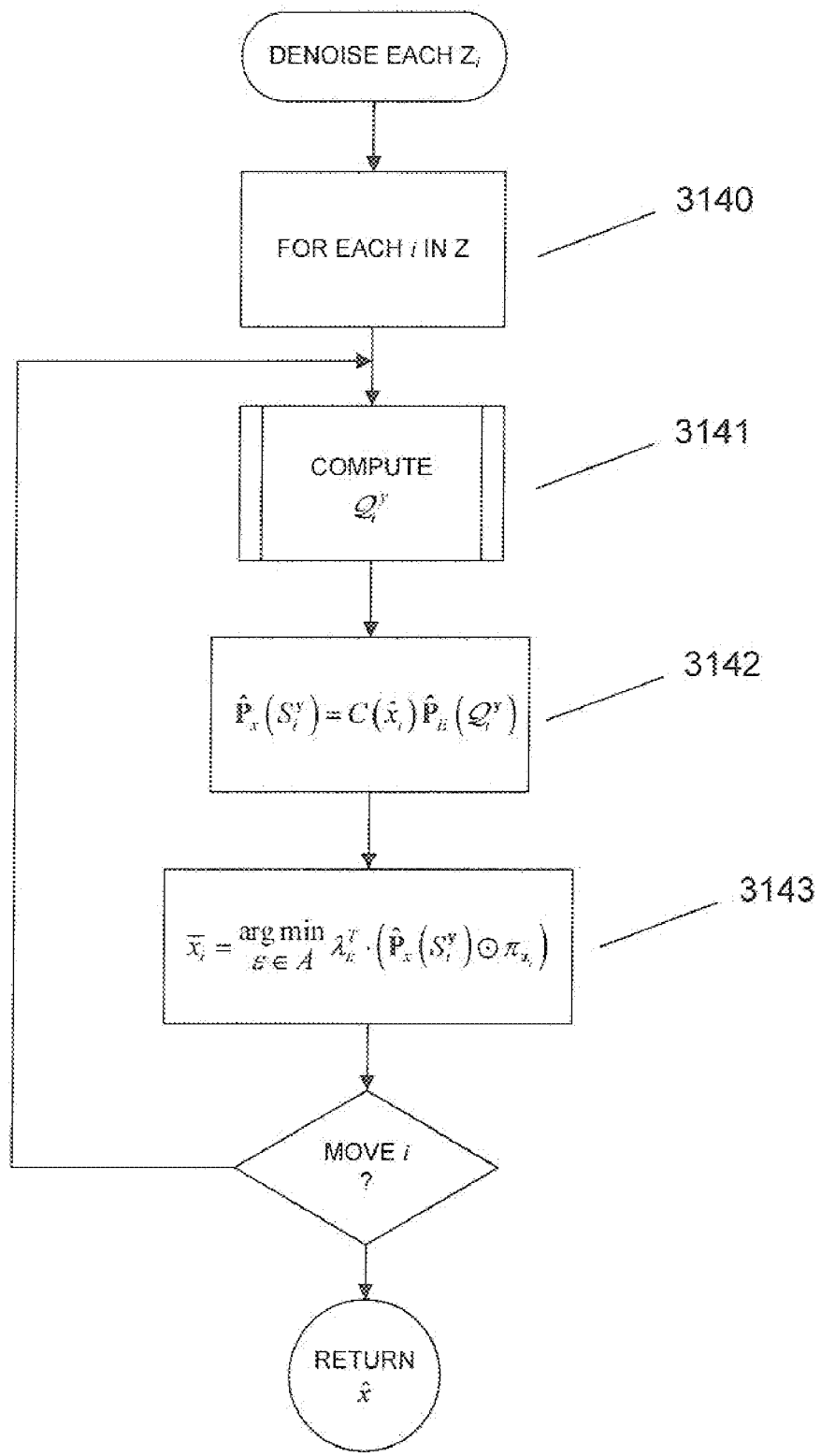

FIG. 31G provides a control-flow diagram for the routine "prediction error normalization," called in step 3106 of FIG. 31A. In the for-loop comprising steps 3135-3138, the estimated probability distributions $\hat{P}_E(Q_k)$ of the prediction errors for each context class $Q_k$ are normalized by:

$$\hat{P}_E(Q_k) = [R']^{-1} \cdot e_k \text{ where } R' = \sum_{i: Q_i^y = Q_k} M'_{(\hat{x}_i)} \prod^T C(\hat{x}_i); \text{ and}$$

$C(\hat{x}_i)$ is constructed as shown in FIG. 30.

This normalization step seeks to correct for systematic bias in the estimate of the prediction-error-statistics vector $e_k$ while suppressing variance. The normalization of the estimated probability distributions $\hat{P}_E(Q_k)$ leads to an unbiased estimate of the estimated probability distributions $\hat{P}(Q_k)$ under a suitable probabilistic model for the clean and noisy images. If $C(\hat{x}_i)$ is not invertible, a pseudo inversion procedure is used, such as:

$$\hat{P}_E(Q_k) = \arg \min_{p \in \Sigma_+^{2M-1}} \|p - R' \cdot e_k\|_2^2$$

where $\Sigma_+^{2M-1}$ is the set of 2M−1 dimensional vectors with non-negative components summing to 1, or, in other words, the probability simplex. For the particular choice of M' given above, a good tradeoff between bias and variance is obtained by setting R' to the diagonal matrix $|Q_k|I$, where I is the identity matrix and $|Q_k|$ is the number of occurrences of the conditioning class $Q_k$.

In a final step 3137, the estimated prediction-error distribution $\hat{P}_E$ is smoothed to eliminate any negative components. This can be accomplished as follows. The entries of $\hat{P}_E(Q_k)$, $-M+1 \leq e \leq M-1$, are denoted as $p_e$. For real numbers a, b, the notation $(a-b)^+$ is used to denote a−b when a>b, and 0 otherwise. Consider a real number $\gamma$, $0 \leq \gamma \leq 1$. Since $\Sigma_e p_e = 1$, there exists a real number $\mu_\gamma$ such that $$\sum_{e=-M+1}^{M-1} (p_e - \mu_\gamma)^+ = \gamma.$$

When $\gamma=1$, the vector with entries $p'_e = (p_3 - \mu_\gamma)^+$ represents the point on the probability simplex that is closest, in $L_2$ distance, to $\hat{P}_E(Q_k)$. The transformation from $\hat{P}_E(Q_k)$ to the vector of entries $p'_e$ can be seen as a smoothing of $\hat{P}_E(Q_k)$ that clips any negative entries $p_c$ as well as, in certain cases, some of the small positive entries. Choosing $\gamma<1$ and renormalizing effects a more aggressive smoothing of the tails of the distribution, which was found, in certain cases, to produce a more robust denoising.

FIG. 31H provides a control-diagram of the routine "denoise each $z_i$," called in step 3107 in FIG. 31A. In the for-loop of steps 3140-3144, the noisy image z is again traversed, pixel-by-pixel. In step 3141, the routine "compute $Q_i^y$" is called in order to determine the conditioning class for the currently-considered pixel. In step 3142, the prediction-error probability distribution for the pixel is computed as:

$$\hat{P}_x(S_i^y) = C(\hat{x}_i)\hat{P}_E(Q_i^y)$$

using the matrix C discussed above with reference to FIG. 30 and the normalized and smoothed $\hat{P}_E(Q_i^y)$ prediction-error probability distribution. Finally, in step 3143, a final clean-image symbol $\bar{x}_i$ estimated for the currently considered noisy-image symbol $z_i$ as:

$$\bar{x}_i = \underset{\varepsilon \in A}{\operatorname{argmin}} \lambda_\varepsilon^T \cdot \left(\hat{P}_x(S_i^y) \square \pi_{x_i}\right)$$

These $\bar{x}_i$ are included in a denoised image $x_c$. As discussed above, each final estimated symbol $\bar{x}_i$ is the symbol for which the estimated distortion is smallest.

As would be well understood by those familiar with information theory, signal denoising, and image manipulation, the methods of the present invention, including the embodiment discussed above with reference to FIGS. 31A-H, involve complex and tedious calculations that can be earned out only by automated methods. It would not be feasible, with respect to time, cost, or reliability, to carry out these denoising methods by hand calculation for even the smallest of real-world images. Method embodiments of the present invention may be implemented in software executed on electronic computers, in firmware executed on electronic computers, logic circuits within electronic devices, including computers, or in some combination of two or more of software, firmware, and logic circuits to generate system embodiments of the present invention, based on electronic computers.

Use of the prefiltered image, y, rather than noisy image z, for bias-statistics collection for prediction classes, in the first phase of statistics collection discussed above with reference to FIG. 31D, removes or ameliorates certain types of noise, prior to undertaking statistics collection, and thus ameliorates or eliminates certain of the distortions discussed above with reference to FIG. 18. By inverting each prediction error prior to accumulation, the prediction-error-vector update operation, discussed with reference to FIGS. 25-27, ameliorates the distortions discussed above with reference to FIG. 18 that can arise when inversion is applied to accumulated statistics corrupted by noise. The prediction-error-vector update operation, discussed above with reference to FIGS. 25-27, updates the prediction-error-statistics vectors with essentially an instantaneous estimate of the unobservable prediction error $x_i - \tilde{x}_i$, rather than estimating prediction errors based on noisy-image symbols, as was done in previous universal denoisers for continuous-tone images.

Although the present invention has been described in terms of particular embodiments, it is not intended that the invention be limited to these embodiments. Modifications will be apparent to those skilled in the art. For example, either software, firmware, or logic circuitry as used to implement all or portions of embodiments of the present invention may vary as various software, firmware, logic-circuit implementation parameters, including modular organization, control structures, data structures, and other such parameters are varied, as part of the design and implementation process. Any of various different partitioning of possible contexts into context classes, conditioning classes, and prediction classes can be employed in various alternative embodiments of the present invention. The canonical representation of contexts may vary, in alternative embodiments of the present invention, and the particular manipulations used for prediction-error-vector updating, normalization, and other such manipulations may additionally vary, in alternative embodiments of the present invention.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for denoising a noisy image z, the method comprising:
   computing, by an electronic computer, a prefiltered image y from the noisy image z;
   collecting, by an electronic computer, bias statistics for each prediction class in a context-by-context analysis of the prefiltered image y;
   collecting, by the electronic computer, prediction-error distributions in a context-by-context analysis of the noisy image z in which prediction-errors $z_i - \tilde{x}_i$ are used to generate prediction-error vectors $e'_k$ that are added to prediction-error-statistics vectors $e_k$;
   generating, by the electronic computer, normalized and smoothed prediction-error probability distributions $\hat{P}_E$ for each conditioning class;
   computing, by the electronic computer, for each noisy-image pixel $z_i$ an estimated clean-image symbol $\bar{x}_i$ by minimizing a computed distortion over all possible symbols $a_0 - a_{M-1}$ of alphabet A and storing $\bar{x}_i$ in a computer-readable memory for subsequent display and/or output to a user.

2. The method of claim 1 wherein collecting, by the electronic computer, bias statistics for each prediction class in a context-by-context analysis of the noisy image z further includes:
   for each prefiltered-image pixel $y_i$,
      determining a context $S_i^y$;
      predicting a clean-image symbol $\tilde{x}$ for the prefiltered-image symbol $y_i$ embedded in the context, $\tilde{x}_i = \tilde{x}(S_i^y)$;
      producing a differential representation $\overline{S}_i^y$ the context $S_i^y$ by a difference operation $D(S_i^y)$;
      generating a canonical representation $C_i^y$ from the differential representation $\overline{S}_i^y$;
      determining a prediction class $\mathcal{R}_i^y$ that corresponds to the canonical representation of the context $C_i^y$ by applying the function $\mathcal{R}$ to $C_i^y$, $\mathcal{R}_i^y = \mathcal{R}(C_i^y)$; and
      using prediction class $\mathcal{R}_i^y$ as an index into a table of $\epsilon$ and n values for each prediction class to update the table entries for prediction class $\mathcal{R}_i^y$ by $$\epsilon(\mathcal{R}_i^y) = \epsilon(\mathcal{R}_i^y) + y_i - \tilde{x}_i$$

$$n(\mathcal{R}_i^y) = n(\mathcal{R}_i^y) + 1; \text{ and}$$

for each prediction class $\mathcal{R}_i^y$,
      computing a final prediction-error bias $\epsilon$ is computed for each prediction class $\mathcal{R}_i^y$ as $$\epsilon(\mathcal{R}_i^y) = \epsilon(\mathcal{R}_i^y)/n(\mathcal{R}_i^y).$$

3. The method of claim 1 wherein collecting, by the electronic computer, prediction-error distributions in a context-by-context analysis of the noisy image z in which prediction-errors $z_i - \tilde{x}_i$ are used to generate prediction-error vectors $e'_k$ that are added to prediction-error-statistics vectors $e_k$ further includes:
for each prefiltered-image pixel $y_i$,
  determining a context $S_i^y$;
  predicting a clean-image symbol $\bar{x}$ for the prefiltered-image symbol $y_i$ embedded in the context, $\tilde{x}_i = \tilde{x}(S_i^y)$;
  producing a differential representation $\overline{S}_i^y$ of the context $S_i^y$ by a difference operation $D(S_i^y)$;
  generating a canonical representation $C_i^y$ from the differential representation $\overline{S}_i^y$;
  determining a prediction class $\mathcal{R}_i^y$ that corresponds to the canonical representation of the context $C_i^y$ by applying the function $\mathcal{R}$ to $C_i^y$, $\mathcal{R}_i^y = \mathcal{R}(C_i^y)$;
  determining a conditioning class $Q_i^y$ that corresponds to the prediction class $\mathcal{R}_i^y$ by applying the function Q to $\mathcal{R}_i^y$, $Q_i^y = Q(\mathcal{R}_i^y)$;
  computing a prediction-error vector $e'_i$ for the noisy-image pixel $z_i$ corresponding to pixel $y_i$; and
  adding the prediction-error vector $e'_i$ to the prediction-error-statistics vector $e_k$ corresponding to conditioning class $Q_i^y$.

4. The method of claim 3 wherein computing a prediction-error vector $e'_i$ for the prefiltered-image pixel $y_i$ further comprises:
multiplication of matrix $M'_{(\tilde{x}_i)}$ by vector $u_M^{z_i}$, wherein the matrix $M'_{(\tilde{x}_i)}$ is a $2(M-1) \times M$ matrix, with the first $M-1-\tilde{x}$ rows and the final $\tilde{x}$ rows having only zero-valued elements, and the interior M rows comprising matrix $(\pi^T)^{-1}$ and wherein the vector $u_M^{z_i}$ is constructed by placing the value "1" in the element of $u_M^{z_i}$ corresponding to the value $z_i$ and placing the value "0" and all other elements of vector $u_M^{z_i}$.

5. The method of claim 1 wherein generating, by the electronic computer, normalized and smoothed prediction-error probability distributions $\hat{P}_E$ for each conditioning class further includes:
computing normalized estimated probability distributions $\hat{P}_E(Q_k)$ of the prediction errors for each conditioning class $Q_k$ by:

$$\hat{P}_E(Q_k) = [R']^{-1} \cdot e_k \text{ where } R' = \sum_{i: Q_i^y = Q_k} M'_{(\tilde{x}_i)} \prod^T C(\hat{x}_i);$$

$C(\hat{x}_i)$ is constructed as shown in FIG. 30; and
$e_k$ are prediction-error-statistics vectors accumulated for each conditioning class k; and
smoothing the estimated probability distributions $\hat{P}_E(Q_k)$, and thereby eliminating negative entries in $\hat{P}_E(Q_k)$.

6. The method of claim 3 wherein generating, by the electronic computer, normalized and smoothed prediction-error probability distributions $\hat{P}_E$ for each conditioning class further includes:
computing normalized estimated probability distributions $\hat{P}_E(Q_k)$ of the prediction errors for each conditioning class $Q_k$ by:

$\hat{P}_E(Q_k) = [R']^{-1} \cdot e_k$ where $R' = |Q_k| I$,
I is the identity matrix,
$|Q_k|$ is the number of occurrences of the conditioning class $Q_k$, and
$e_k$ are prediction-error-statistics vectors accumulated for each conditioning class k; and
smoothing the estimated probability distributions $\hat{P}_E(Q_k)$, and thereby eliminating negative entries in $\hat{P}_E(Q_k)$.

7. The method of claim 1 wherein computing, by the electronic computer, for each noisy-image pixel $z_i$ an estimated clean-image symbol $\bar{x}_i$ by minimizing a computed distortion over all possible symbols $a_0$-$a_{M-1}$ alphabet A further includes:
for each prefiltered-image pixel $y_i$,
  computing a context-specific prediction-error probability distribution by $\hat{P}_x(S_i^y) = C(\hat{x}_i) \hat{P}_E(Q_i^y)$, wherein construction of the matrix $C(\hat{x}_i)$ is shown in FIG. 30 and wherein $\hat{P}_E(Q_i^y)$ is a normalized and smoothed prediction-error probability distribution;
  computing a clean-image symbol $\bar{x}_i$ predicted for the currently considered noisy-image symbol $z_i$ and corresponding prefiltered image pixel $y_i$ as:

$$\bar{x}_i = \operatorname*{argmin}_{\varepsilon \in A} \lambda_\varepsilon^T \cdot (\hat{P}_x(S_i^y) \square \pi_{z_i}).$$

8. The method of claim 1 further comprising:
again denoising the noisy image z by
  using the denoised image containing symbols $\bar{x}_i$ as a next prefiltered image y;
  collecting, by the electronic computer, bias statistics for each prediction class in a context-by-context analysis of the next prefiltered image y;
  collecting, by the electronic computer, prediction-error distributions in a context-by-context analysis of the noisy image z in which prediction-errors $z_i - \tilde{x}_i$ are used to generate prediction-error vectors $e'_k$ that are added to prediction-error-statistics vectors $e_k$;
  generating, by the electronic computer, normalized and smoothed prediction-error probability distributions $\hat{P}_E$ for each conditioning class;
  computing, by the electronic computer, for each noisy-image pixel $z_i$ an estimated clean-image symbol $\bar{x}_i$ by minimizing a computed distortion over all possible symbols $a_0$-$a_{M-1}$ of alphabet $\bar{x}_i$ and storing $\bar{x}_i$ in a computer-readable memory for subsequent display and/or output to the user.

9. The method of claim 8 further comprising iteratively denoising the noisy image z by iterating the steps of claim 8 until a convergence criterion or termination condition is met.

10. An electronic-computer-based image-denoising-system comprising:
an electronic computer; and
a control program that directs the electronic computer to denoise an input noisy image z by
  computing, by the electronic computer, a prefiltered image y from the noisy image z;
  collecting, by the electronic computer, bias statistics for each prediction class representing one or more contexts within each conditioning class in a context-by-context analysis of the noisy image z;
  collecting, by the electronic computer, prediction-error distributions in a context-by-context analysis of the noisy image z in which prediction-errors $y_i - \tilde{x}_i$ are used to generate prediction-error vectors $e'_k$ that are added to prediction-error-statistics vectors $e_k$;
  generating, by the electronic computer, normalized and smoothed prediction-error probability distributions $\hat{P}_E$ for each conditioning class; and
  computing, by the electronic computer, for each noisy-image pixel $z_i$ an estimated clean-image symbol $\bar{x}_i$ by minimizing a computed distortion over all possible symbols $a_0$-$a_{M-1}$ of alphabet A and storing $\bar{x}_i$ in a computer-readable memory for subsequent display and/or output to a user.

* * * * *

UNITED STATES PATENT AND TRADEMARK OFFICE
CERTIFICATE OF CORRECTION

PATENT NO. : 8,300,979 B2  Page 1 of 1
APPLICATION NO. : 12/511776
DATED : October 30, 2012
INVENTOR(S) : Erik Ordentlich et al.

It is certified that error appears in the above-identified patent and that said Letters Patent is hereby corrected as shown below:

In the Specifications:

In column 19, line 45, delete " $\epsilon(\mathcal{R}_j)/n\epsilon(\mathcal{R}_j),$ " and insert -- $\epsilon(\mathcal{R}_j)/n(\mathcal{R}_j),$ --, therefor.

In the Claims:

In column 22, line 46, in Claim 2, after " $\overline{S}_i^y$ " insert -- of --.

In column 23, line 1, in Claim 3, delete "$e'_k$" and insert -- $e_k$ --, therefor.

In column 23, line 50, in Claim 6, delete "claim 3" and insert -- claim 1 --, therefor.

In column 24, line 2, in Claim 7, after "$a_0$-$a_{M-1}$" insert -- of --.

In column 24, line 35, in Claim 8, after "alphabet" delete " $\overline{X}_i$ " and insert -- A --, therefor.

In column 24, lines 41-42, in Claim 10, delete "image-denoising-system" and insert -- image-denoising system --, therefor.

Signed and Sealed this
Sixth Day of August, 2013

Teresa Stanek Rea
*Acting Director of the United States Patent and Trademark Office*